United States Patent [19]
Minami et al.

[11] Patent Number: 5,933,185
[45] Date of Patent: Aug. 3, 1999

[54] SPECIAL EFFECT APPARATUS

[75] Inventors: Nobuyuki Minami; Tetsuro Nakata; Katsuakira Moriwake; Tetsuya Harada; Motomu Ueta, all of Kanagawa, Japan

[73] Assignee: Sony Corporation, Tokyo, Japan

[21] Appl. No.: 08/776,514

[22] PCT Filed: May 31, 1996

[86] PCT No.: PCT/JP96/01491

§ 371 Date: Jul. 10, 1997

§ 102(e) Date: Jul. 10, 1997

[87] PCT Pub. No.: WO96/38979

PCT Pub. Date: May 12, 1996

[30] Foreign Application Priority Data

May 31, 1995 [JP] Japan ................................. 7-158599

[51] Int. Cl.$^6$ .................................................. H04N 7/18
[52] U.S. Cl. ............................................. 348/42; 382/154
[58] Field of Search ................................. 348/42, 46.51; 382/154; 396/324; H04N 7/18

[56] References Cited

U.S. PATENT DOCUMENTS

| | | | |
|---|---|---|---|
| 4,819,064 | 4/1989 | Diner | 348/47 |
| 4,954,890 | 9/1990 | Park | 348/42 |
| 5,175,616 | 12/1992 | Milgram et al. | 348/47 |
| 5,625,408 | 4/1997 | Matsugu et al. | 348/42 |
| 5,646,679 | 7/1997 | Yano et al. | 348/42 |

FOREIGN PATENT DOCUMENTS

| | | |
|---|---|---|
| 3-205976 | 9/1991 | Japan . |
| 3-297285 | 12/1991 | Japan . |
| 4-40176 | 2/1992 | Japan . |
| 6-54255 | 2/1994 | Japan . |
| 6-303506 | 10/1994 | Japan . |
| 7-59001 | 3/1995 | Japan . |

*Primary Examiner*—Richard Lee
*Attorney, Agent, or Firm*—Frommer Lawrence & Haug, LLP.; William S. Frommer; Dennis M. Smid

[57] ABSTRACT

In an image special effect apparatus for forming a special effect image in which a plurality of images mutually intersect each other, the aforementioned plurality of intersecting images are allowed to be synthesized by incorporating depth information including images having residual images so that a special effect image is generated which does not provide a sense of awkwardness at a crossing point.

41 Claims, 25 Drawing Sheets

○ : DATA MEMORIZED IN THE FRAME MEMORY
× : READING ADDRESS POINT

○ : DATA MEMORIZED IN THE FRAME MEMORY
× : READING ADDRESS POINT (A)  — $V_{OAT}$ (B)  — $K_{OAT}$ (C)  — $H_{OAT}$

SPECIAL EFFECT APPARATUS

TECHNICAL FIELD

The present invention relates to a special effect apparatus, and more particularly to a special effect apparatus which is preferably applied to a case in which a special effect image is prepared such that a plurality of images intersect each other while retaining residual images in stereoscopic space over a lapse of time.

BACKGROUND ART

Conventionally, in the case where a special effect image is prepared such that one image that moves while retaining residual images in stereoscopic space intersects another image, it is thought that past images A1, A2 ... A5 remain at positions at an infinite point (Z=∞) in a backward direction (on the Z-axis in other words) with respect to a screen surface 1 (located on the XY-coordinate axis) so that residual images A11, A12, ... A15 of the past images A1, A2, ... A5 of a moving body A can be projected on a screen surface 1 to be produced as shown in FIG. 1(A). Out of the past images A1, A2, ... A5, the priority of an image is higher the nearer it is to the screen surface 1. Thus, priority is set so that higher priority is given to a position located at a place nearer to the screen surface. As a consequence, a position having the highest priority is to be projected on the frontmost surface.

Thus, supposing that a moving body A moves from the position of a past image A1 to the position of the current image A6 by moving diagonally from the right backward direction to the left forward of the screen surface 1 while subsequently passing through the positions of images A2, A3, A4 and A5. There will be an order of higher priority which corresponds to the positions $Z=Z_{A6}$, $Z_{A5}$, $Z_{A4}$, $Z_{A3}$, $Z_{A2}$, $Z_{A1}$, in the order beginning with images nearest to the screen surface 1, and there will be residual images A6, A5, A4, A3, A2, A1 between the past images A1 through A5 and the current image A6 as shown in the equation:

$$Z_{A6} > Z_{A5} > Z_{A4} > Z_{A3} > Z_{A2} > Z_{A1} \tag{1}$$

As a consequence, when it comes to the residual images A11 through A15 that correspond to the past images A1 through A5, as residual images at an infinite point Z=∞, the part of the image A1 which is not overlapped by the past image A2 located at a position nearer to the screen surface is retained as a residual image A11, while the image part of the past image A2 which is not covered by the past image A3 located at a position nearer to the screen surface 1 is retained as a residual image A12, the part of past image A3 which is not covered by the past image A4 located at a position nearer to the screen surface 1 is retained as a residual image A13, the part of past image A4 that is not covered by past image A5 located at a position nearer to the screen is retained as a residual image A14, and an image A5 located at the position nearest to the screen surface 1 out of all the past images is retained as a residual image A15 as a whole.

On the other hand, it is thought that the current image A6 of the moving body A is located at a position of $Z=Z_{A6}$ in the Z direction which is greater in the priority order in which the images are produced on the screen surface 1 than the residual images A15 through A11.

In addition, since the current image A6, and residual images A15, A14, A13, A12, A11 are images which go back into the past in a consecutive order, the residual images A5, A4, ... A1 on the screen surface 1 are displayed so that the tone thereof becomes thinner while the current image A6 on the screen surface 1 has the thickest tone through a consecutive key processing of keying levels using keying levels K6 through K1 that correspond to the sizes up to the past points, as is shown in the following equation:

$$K6(=1) > K5 > K4 > K3 > K2 > K1 > K0 \tag{2}$$

consecutively from K6 (=1) as a key signal KEY, as shown in FIG. 1(B).

When such image processing is performed, the moving body A moves from the position of the image A1 to the position of the image A6 as described above so that the current image A6 and the part of the residual image A15 which is not covered by the image A6 are displayed together on the right side of the current image A6 on the screen surface 1. At the same time, the residual images A14, A13, A12 and A11 are displayed on the right side of the image A6 with the result that an image can be displayed on the screen surface 1 such that the moving image A moves in XYZ space while retaining a residual image thereof.

In the case where an image of a fixed plate B is assembled which is diagonally arranged in the Z direction with respect to the screen surface 1 so as to shield the moving track of such moving body A so that an image is obtained such that the moving body A having residual images A15 through A11 moves forward by passing through the fixed plate B from the backward direction, a higher priority is assigned to images located at a position nearer to the screen surface 1, with respect to the display priority order of the image A6, the residual images A15 through A11, and the fixed plate B, in the same manner as described with respect to the equation (1) on the basis of the position in the Z direction.

In such a conventional structure, as shown in FIG. 2(A), when the moving body A moves to a position of an image A3 which intersects the fixed plate B by passing through the position of the image A2 from the position of the past image A1, the moving body A is located at the position of the current image A3 ($Z=Z_{A3}$) while the residual images A12 and A11 of the past images A2 and A1 are located at the position of Z=∞. At the same time, with respect to the keying signal KEY, as shown in FIG. 2(B), the largest keying level is assigned to the current image A3 in the order of the keying levels K3 (=1), K2 and K1 in the order of the current image A3 of the moving body A, the residual image A12, and the residual image A11 as shown in the equation:

$$K3(=1) > K2 > K1 > 0 \tag{3}$$

At the same time, the low keying levels K2 and K1 are subsequently assigned to the residual images A12 and A11.

In this manner, the image displayed on the screen surface 1 at the timing at which the image A3 intersects the image on the fixed surface B is displayed on the screen surface 1 as an image B111 which is diagonally arranged on the basis the perspective method, as shown in FIG. 3, whereas the image A131, the part out of the current image A3 of the moving body A which projects forward of the fixed plate B, is displayed in the keying level K3 (=1) and the image part A132, the part out of the current image A3 of the moving body A which is covered by the fixed plate B, is not produced. At the same time, the image part A131 which is not covered by the fixed plate B is displayed in the tone of the keying level K3 (=1).

On the other hand, with respect to the residual image A12 of the past image A2, the image part A121, which is not covered by the fixed plate B or the current moving body A, is displayed in the tone of the keying level K2 whereas the image part A122, which is covered by the current image A3 of the moving body A, is not produced on the screen surface 1.

In the same manner, out of the past image A1 of the moving body A the part A111, which is not covered by the past image A2, is displayed on the screen surface 1 in the tone of the keying level K1 whereas the image part A112, which is covered by the image part A2, is not produced on the screen surface 1.

In this manner, the image on the screen surface 1 at the timing at which part of the image of the moving body A passes through the image on the fixed plate B is displayed so that images A2 and A3 are expanded gradually in a thicker tones which gradually come closer from the image A1 located at a distant position in the Z direction with respect to the screen surface 1. At the same time, only part A131, located forward of the fixed plate B, and an image part A133, located at an uncovered position at the rear of the fixed plate B, are displayed so that an image can be harmoniously displayed on the screen surface 1 which represents a state in which the moving body A partially passes through the fixed plate B while tailing along the residual image parts A121 and A111 of the residual images A12 and A11.

However, in accordance with the conventional method, there is a problem in that out of the residual images, the residual images A14 and A15 of the past images A5 and A4, which are located in front of the fixed plate B, cannot be produced as shown in FIG. 4 when the moving body A moves to a position where the fixed plate B is not covered after the moving body A completely passes through the fixed plate B.

Incidentally, since the priority of the residual images A14 and A15 of the images A5 and A4 in front of the fixed plate B is given to a position at an infinite point ($Z=\infty$), the parts A153 and A141, located at positions that cover the image of the fixed plate B in the front of the fixed plate B, are covered on the contrary by the image B111 when the parts A153 and A141 are produced on the screen surface 1.

Thus, there is a problem in that only a special effect image which gives an sense of awkwardness can be generated, in that the residual image parts A153, A141 and A132 thereof, which should be displayed in the front by passing through the image B111 of the fixed plate B and the image B111 of the fixed plate B, cannot be produced in front of the image B111 of the fixed plate B despite the fact that it is desired that an image can be obtained such that the moving body A passes through the image of the fixed plate B while retaining the residual images A15, A14, A13, A12 and A11.

DISCLOSURE OF THE INVENTION

The present invention has been made in view of the aforementioned points and the invention is intended to provide an image special effect apparatus which is capable of generating a special effect image which does not give an sense of awkwardness with respect to two images which intersect each other while retaining residual images.

To solve such a problem, the present invention provides a special effect apparatus which comprises: an input means for receiving first video data, a first key signal for keying the first video data, first depth information indicative of the depth position of the first video data and a second key signal for keying second video data; an image conversion control means being connected to receive the second video data and the second key for generating the converted second video data and the converted second key signal by subjecting the second video data and the second key signal to a spatial image conversion; a combining means for generating third video data and a third key signal for keying the third video data, the third video data comprising video data in which the first video signal data and the third video signal data are combined on the basis of the first key signal, the first depth information, the converted second key signal and the second depth information; and a residual image generating means for generating the delayed video data delayed with respect to the third video data, a delayed key signal delayed with respect to the third video data and delayed depth information delayed with respect to the first and the second information, thereby controlling an output of the delayed video data, the delayed key signal, and the delayed depth information so as to generate third video data, a third key signal and a residual image of the depth information.

The first and the second video data are combined on the basis of the first and the second key signal and the first and the second depth information in the combining means to generate the third video signals. At the same time, a third key signal is generated on the basis of the first and the second key signal, the third signal keying the third video signal comprising the combined first and the second video signals. The third video signal and the third key signal are subjected to delay processing by the residual image generating means. As a consequence, a residual image with respect to the third video signal and the third key signal is generated.

In addition, in the residual image generation means, depth information is generated which corresponds to the residual image of the third video signal and the third key signal so that the first and the second image comprising the first and the second video signal are combined with the combining means in a priority order which is determined by the depth of the corresponding first depth and second depth. At the same time, delay depth information is generated with respect to a residual image of the third video signal with is generated with the residual image means.

As a consequence, at the time when a plurality of images are displayed which intersect each other, a special effect image can be generated which gives no sense of awkwardness with respect to an image at the intersecting part by providing depth information to each of the images and the residual images thereof.

BEST MODE FOR CARRYING THE INVENTION

Figure 1:
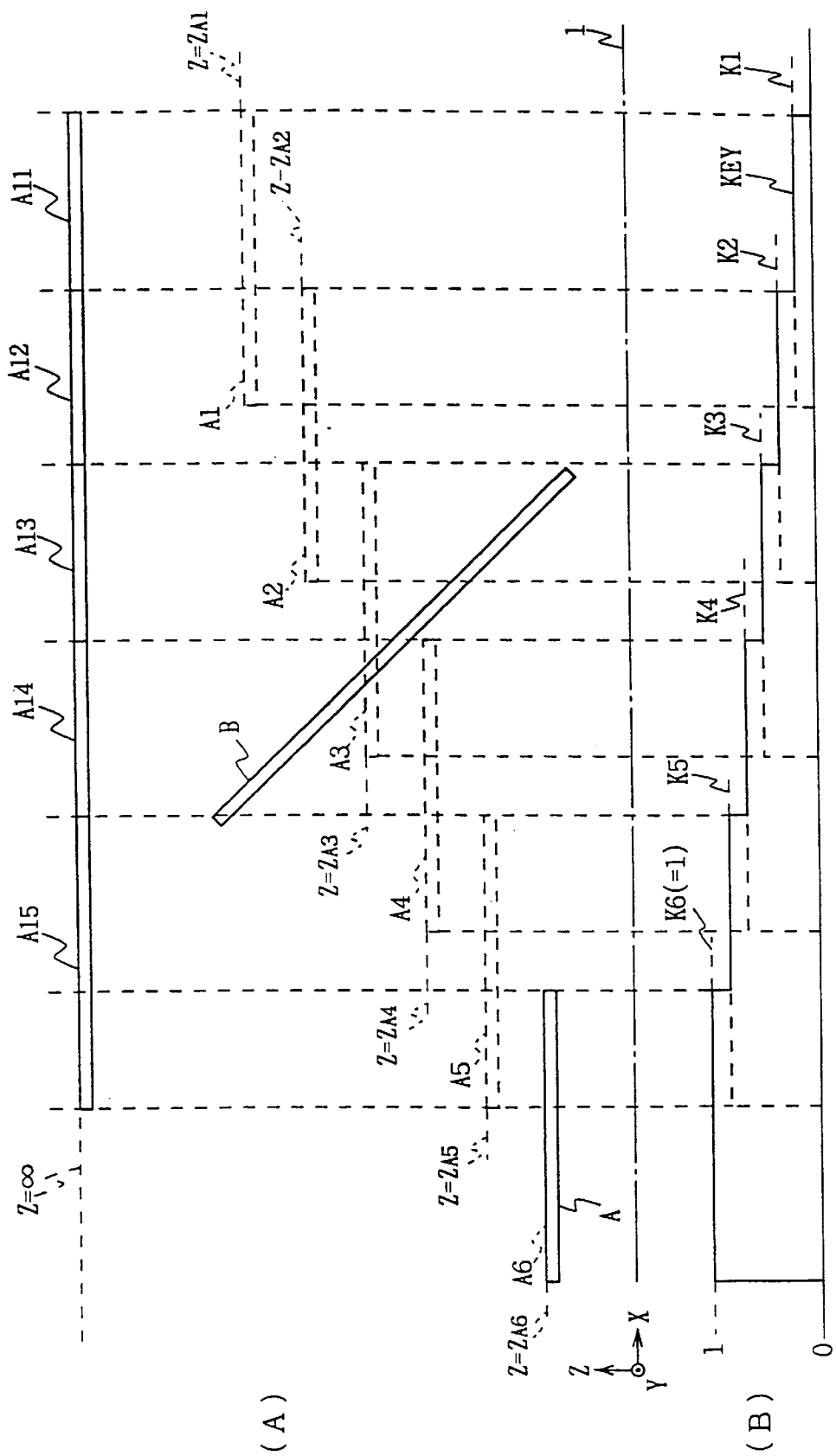
FIGS. 1(A) and (B) are schematic diagrams explaining the conventional method for generating a residual image.
Figure 2:
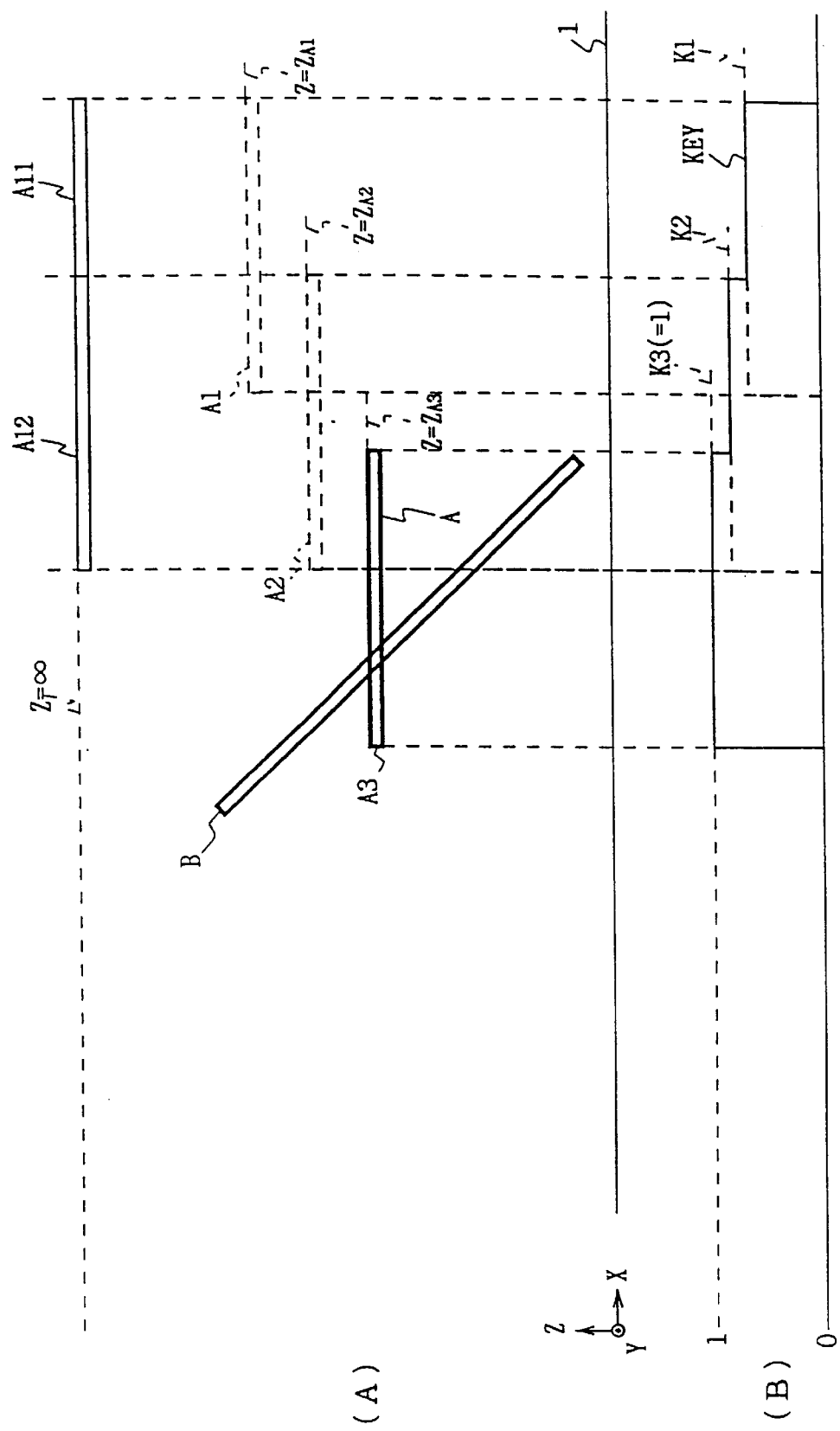
FIGS. 2(A) and (B) are schematic diagrams showing a state in which an image of a moving body intersects an image of a fixed plate.
Figure 3:
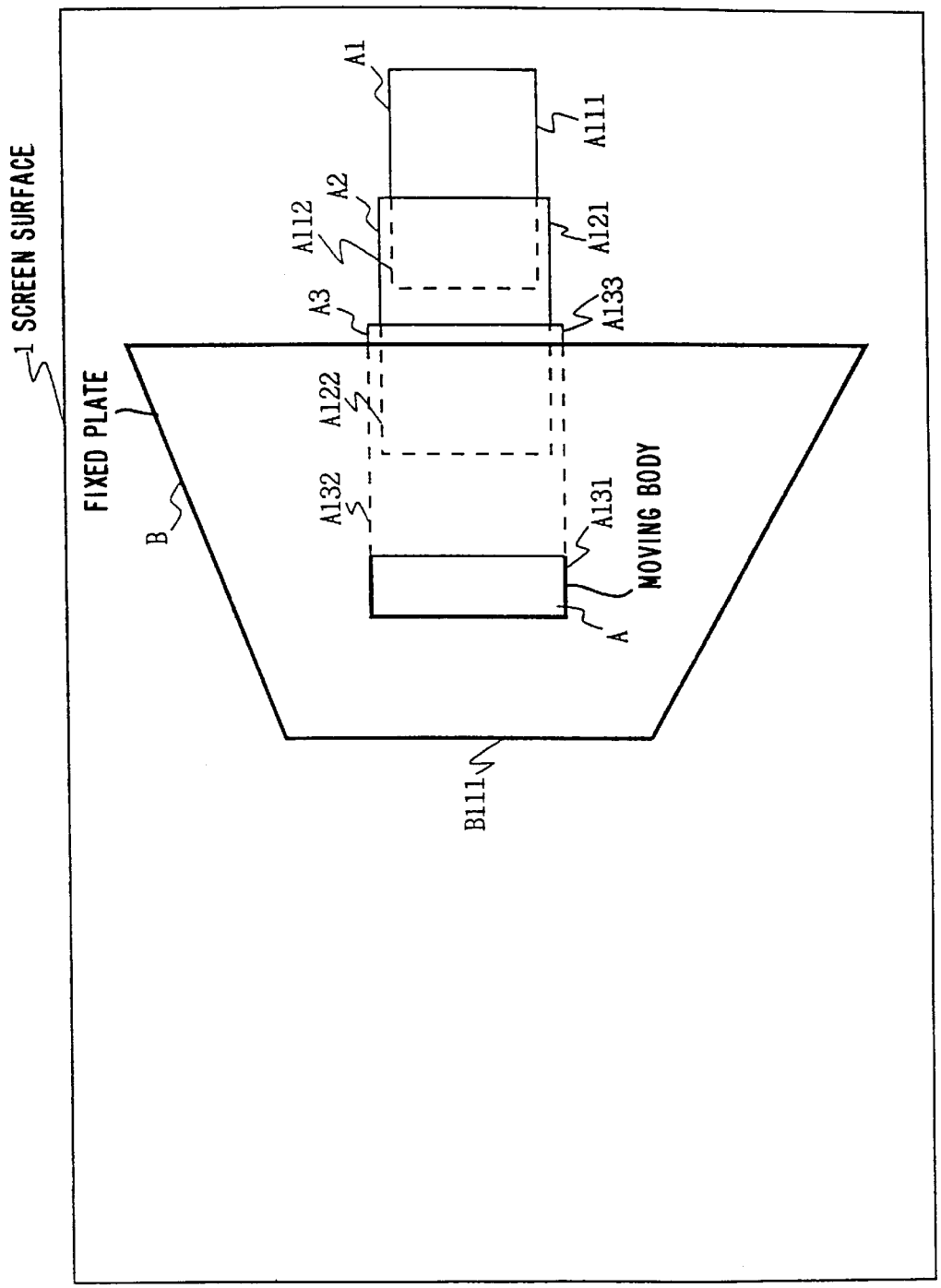
FIG. 3 is a schematic diagram showing an image on a screen surface in the state shown in FIGS. 2(A) and (B).
Figure 4:
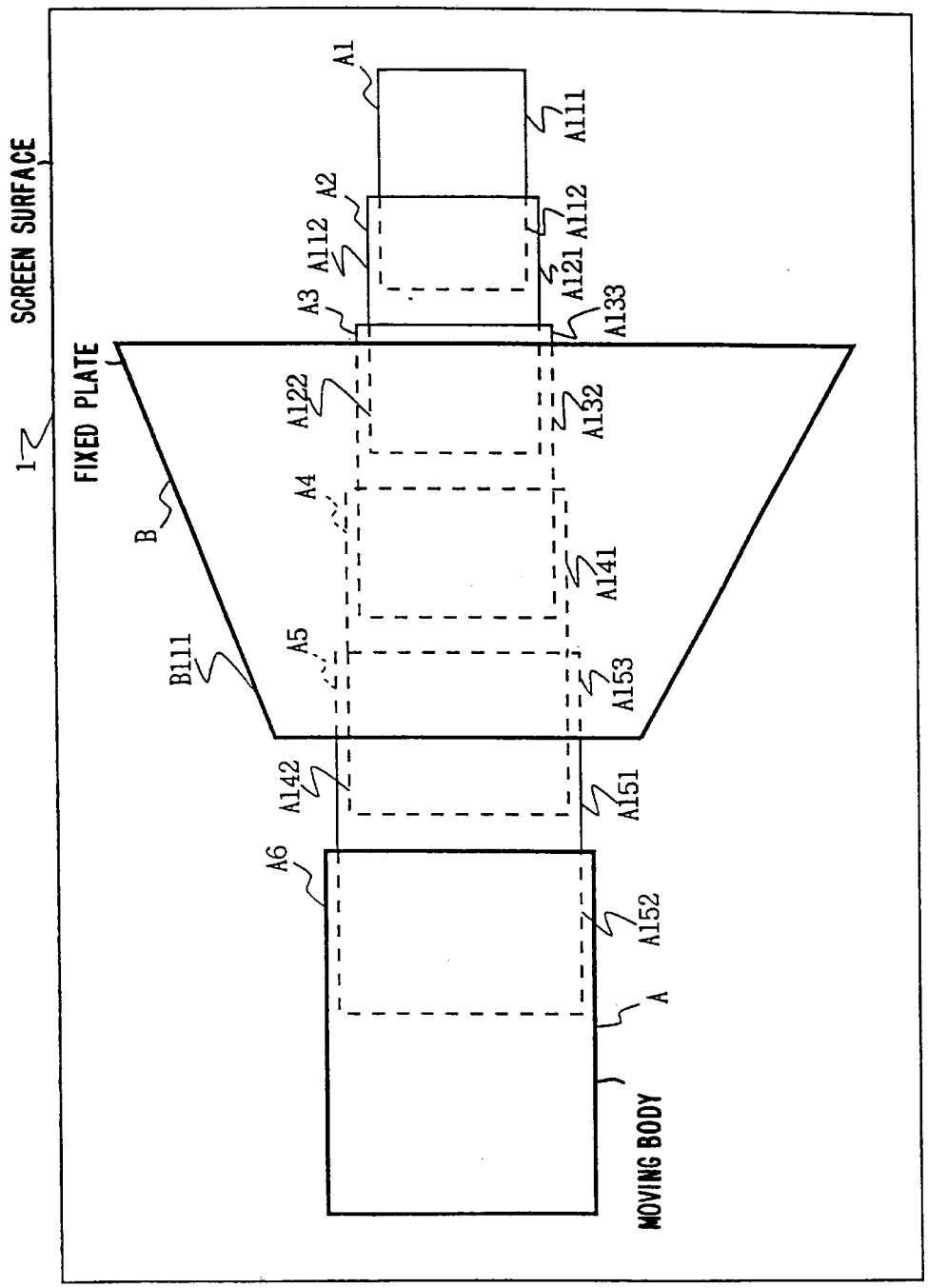
FIG. 4 is a schematic diagram showing an image on the screen surface when the current image of the moving body passes through the image of the fixed plate.
Figure 5:
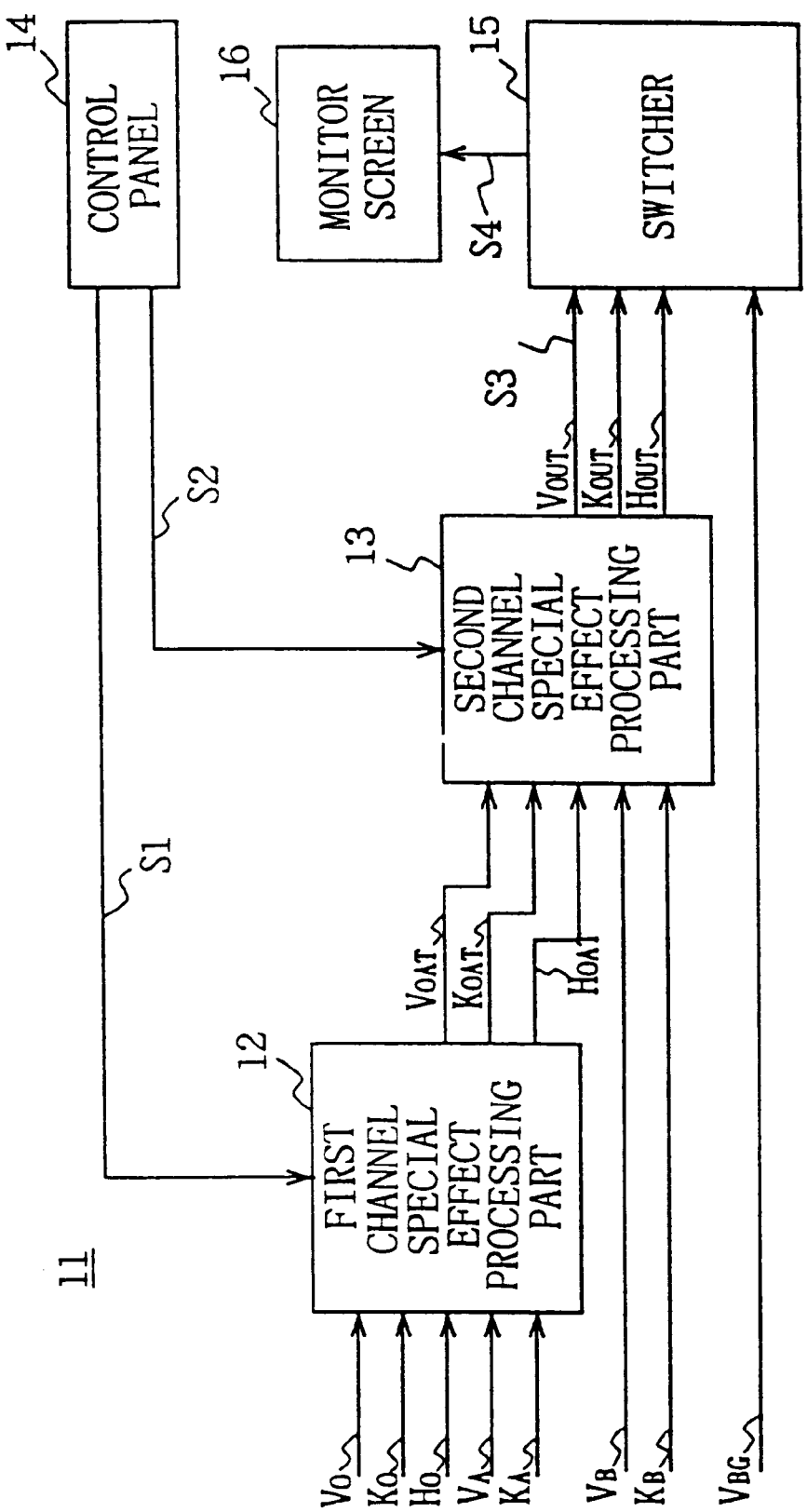
FIG. 5 is a block diagram showing a special effect apparatus according to the present invention.

One embodiment of the present invention will be explained in detail with respect to the drawings hereinafter.
(1) Overall Structure In FIG. 5, reference numeral 11 denotes a special effect system as a whole which has a first channel special effect processing part 12 and a second channel special effect processing part 13 which are subsequently connected to a cascade. Special effect image information S3 which is subjected to special effect processing, is supplied to a switcher 15 on the basis of control information S1 and S2 input from a control panel 14 to the special effect processing parts 12 and 13 on the basis of an operation performed by an operator. In the switcher 15, the supplied special effect image information S3 is subjected to switching processing with background information $V_{BG}$ on the basis of a key signal, with the result that output image information S4 formed by the switching processing is displayed on the monitor screen 16.

Figure 6:
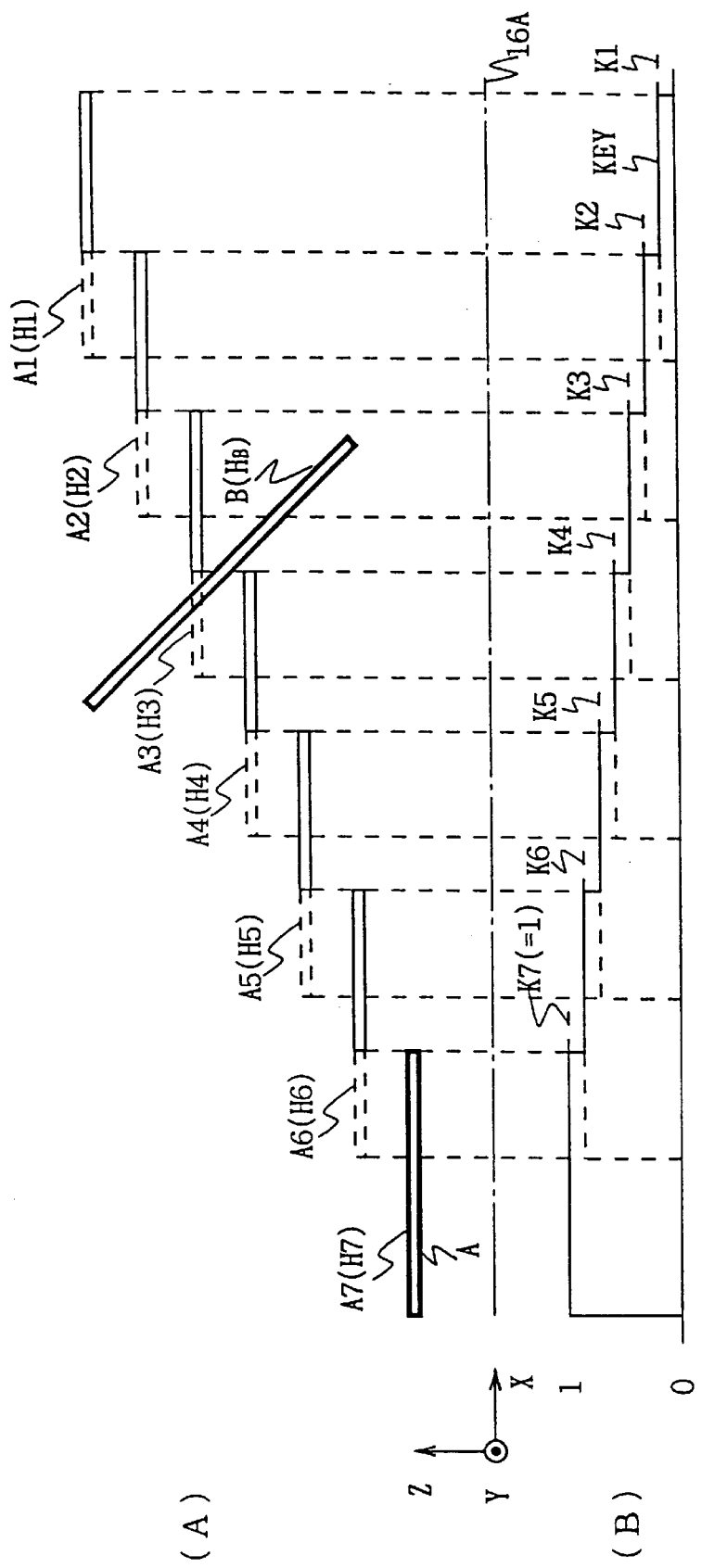
FIGS. 6(A) and (B) are schematic diagrams showing a relation between an image of the moving body and an image of the fixed plate.

In the case of this embodiment, as shown in FIG. 6(A), the special effect apparatus 11 can produce a special effect image such that an imaginary stereoscopic image is projected on a screen surface 16A which passes through a fixed plate B arranged in a backward direction from the right front side to the left rear side in the midst of the movement of a moving body A from the right rear side to the left front side in three-dimensional XYZ-coordinate space at the back of the screen surface 16A of the monitor screen 16.

Figure 7:
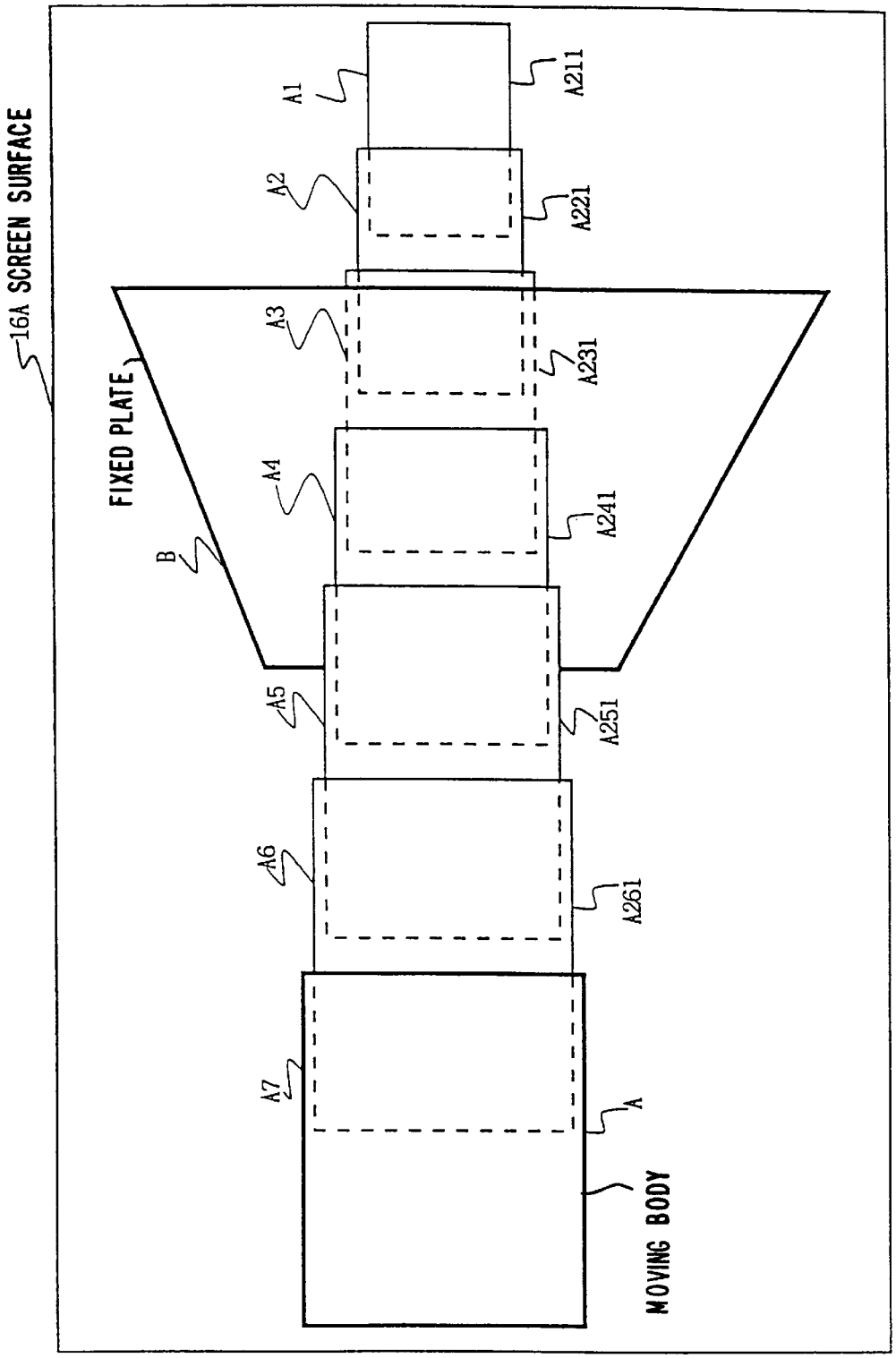
FIG. 7 is a schematic diagram showing an image display on the screen surface when the current image of the moving body passes through the image of the fixed plate.

As shown in FIG. 7, the moving body A is produced in such a manner that the residual image parts A261 and A251, . . . A211 of the past images A6, A5, . . . A1 tail so as to pass through the fixed plate B with respect to the current image A7 (an image having a residual image in this manner is referred to as an image with an attached residual image hereinafter).

Figure 8:
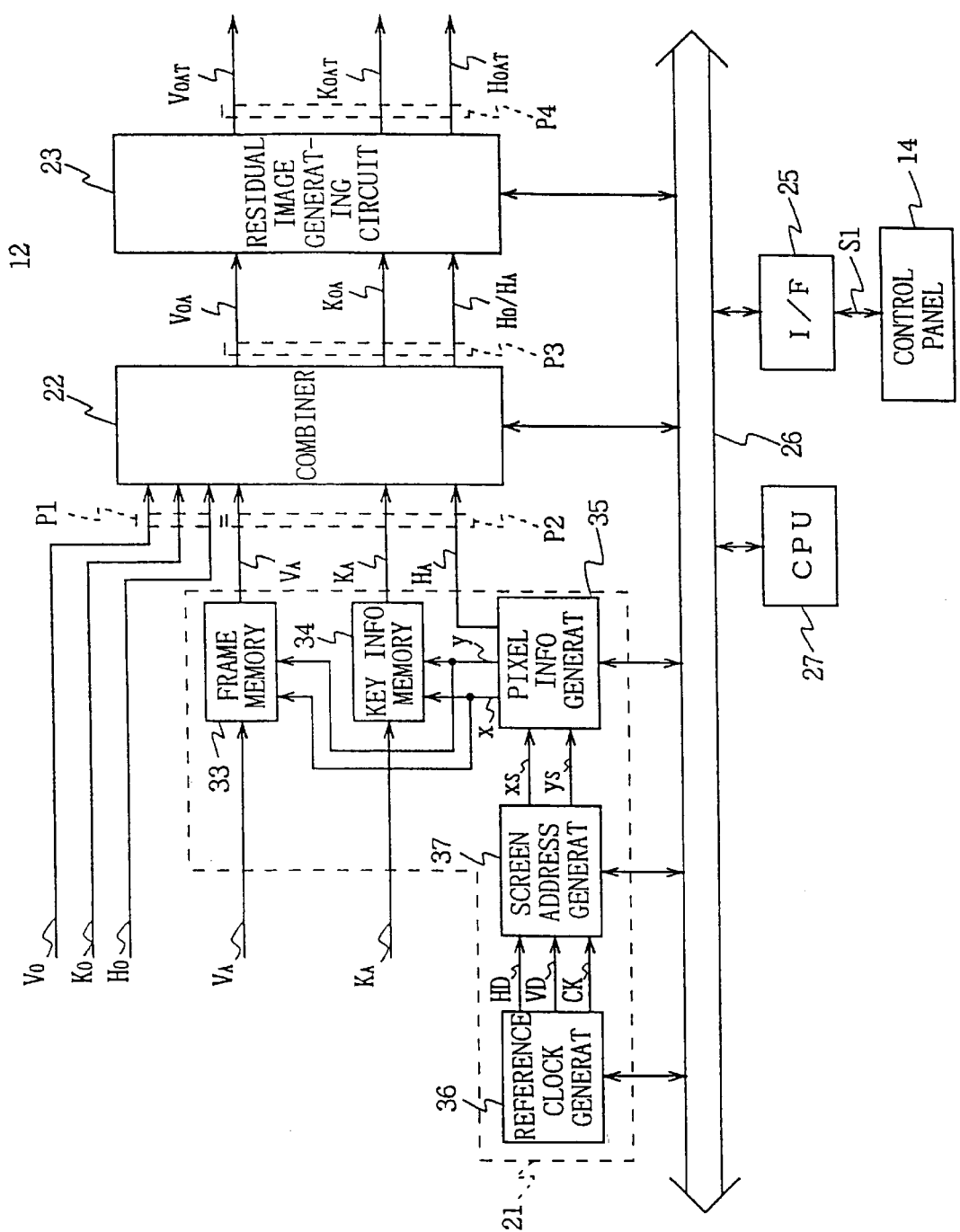
FIG. 8 is a block diagram showing a first channel special effect processing part.

The first channel special effect projecting part 12 is constituted in such a manner that a second image information P2 obtained from a combined image forming part 21 is synthesized with respect to the first image information P1 supplied from the outside as shown in FIG. 8, so that the synthesized image information P3 obtained from the combiner 22 in this manner is subjected to processing in which a residual image is attached in the residual image generating circuit 23 so that residual image information P4 may be obtained.

The first channel special effect processing part 12 having such a structure is constituted so that the processing part 12 incorporates control information S1 provided from a control panel 14 in a central processing unit (CPU) 27 via an interface 25 and a bus 26, while a CPU 27 controls a combined image forming part 21, a combiner 22, and an image generating circuit 23 via a bus 26 in accordance with a program corresponding to the control information.

The first image information P1, second image information P2, synthesized image information P3 and residual information P4 of an image with an attached residual image have video information (represented by a symbol V) for displaying the special effect image, keying information (represented by a symbol K) for displaying the position at which the image is to be displayed on the screen surface 16A, depth information (represented by a symbol H) for displaying the depth of the image as information corresponding to a pixel on a screen surface 16A.

A combined image forming part 21 has a frame memory 33 for memorizing video data $V_A$ for displaying an image of the moving body A (FIGS. 6 and 7), a key information memory 34 for memorizing key data $K_A$ for keying an image of the moving body A from the video data $V_A$ so that the reading address Xs and Ys of the fame memory 33 and the key information memory 34 are generated by converting and processing in the pixel information generating circuit 35 on the basis of the conversion information input from the control panel 14.

In this embodiment, video data memorized in the frame memory 33 and a key signal memorized in the key information memory are subjected to spatial image conversion in response to a plurality of conversion parameters input from a control panel through an operation by an operator. This spatial image conversion is not such that the three-dimensionally converted image is projected onto a monitor screen after an actual conversion of the image in three dimensions, but is such that two-dimensional data which is displayed on the monitor is calculated from the input two-dimensional data. This calculation will be described later.

The combined image forming part 21 generates in a sequential manner screen addresses signals xs and ys so as to correspond to a raster scan of the monitor by providing a clock signal (CK), a horizontal synchronization signal HD and a vertical synchronization signal VD for reading each pixel of the monitor screen 16 to a screen address generating circuit 37 in a reference clock generating circuit 36. Then the combined image forming part 21 provides these screen address signals xs and ys to the image information generating circuit 35. This screen address refers to an address signal which is supplied in an order corresponding to the raster scan of the monitor screen.

In the case where these screen address signals xs and ys are output as reading addresses x and y as they are without undergoing a conversion processing in the image information generation circuit 35, the image memorized in the frame memory 33 and the key information memory 34 are output as video data $V_A$ and the key data $K_A$ of the second image information as is. In other words, this is the case in which spatial image conversion is not performed at all.

On the other hand, in the case where the image memorized in the frame memory 33 and the key information memory 34 is subjected to three dimensional spatial image conversion execution such that the image is enlarged, reduced, moved and rotated, the image information generating circuit 35 generates reading addresses X and Y with respect to the frame memory 33 and the key information memory 34 from the standard address signal xs and ys and a plurality of conversion parameters. A predetermined spatial image conversion is executed with respect to the memory data by supplying the generated two-dimensional reading address to the frame memory 33 and the key information memory 34.

When a two dimensional reading address is generated for executing the spatial image conversion, depth information H for representing the position in the depth direction (that is, the Z direction) from the screen surface 16A is simultaneously generated with respect to each pixel of an image which is produced on the screen surface 16A. This depth information includes information for indicating how deep the information is with respect to the screen surface. In the case where the information is located at the deepest position (the depth is infinite), the depth information value is "0".

The depth information generated at the time of the spatial image conversion will be explained hereinafter.

In the beginning, a matrix T for subjecting an image of video data VA to spatial image conversion such as enlargement, reduction, movement, rotation or the like can be represented in a four line by four column conversion matrix T as follows:

$$T = T_0 \cdot P_0 \quad (4)$$

$$= \begin{pmatrix} r_{11} & r_{12} & r_{13} & 0 \\ r_{12} & r_{22} & r_{23} & 0 \\ r_{31} & r_{32} & r_{33} & 0 \\ l_x & l_y & l_z & S_0 \end{pmatrix} \cdot \begin{pmatrix} 1 & 0 & 0 & P_{0x} \\ 0 & 1 & 0 & P_{0y} \\ 0 & 0 & 1 & P_{0z} \\ 0 & 0 & 0 & 1 \end{pmatrix}$$

$$= \begin{pmatrix} r_{11} & r_{12} & r_{13} & r_{11}P_{0x} + r_{12}P_{0y} + r_{13}P_{0z} \\ r_{12} & r_{22} & r_{23} & r_{12}P_{0x} + r_{22}P_{0y} + r_{23}P_{0z} \\ r_{31} & r_{32} & r_{33} & r_{13}P_{0x} + r_{32}P_{0y} + r_{33}P_{0z} \\ l_x & l_y & l_z & l_xP_{0x} + l_yP_{0y} + l_zP_{0z} + S_0 \end{pmatrix}$$

wherein $T_0$ represents a matrix representing a conversion of movement and rotation and $P_0$ represents a matrix for executing enlargement, reduction and perspective conversion considering that the center of the screen surface 16A constitutes the center of the coordinate system. Incidentally, the 4×4 conversion matrix, which is different from the rotation conversion in dimensions such as enlargement and reduction, is represented in the same coordinate system. Thus this is generally referred to as a homogeneous coordinate system.

Here when the equations are set as follows:

$$P_x = r_{11}P_{0x} + r_{12}P_{0y} + r_{13}P_{0z} \quad (5)$$

$$P_y = r_{12}P_{0x} + r_{22}P_{0y} + r_{23}P_{0z}$$

$$P_z = r_{13}P_{0x} + r_{32}P_{0y} + r_{33}P_{0z}$$

$$S = l_xP_{0x} + l_yP_{0y} + l_zP_{0z} + S_0$$

the following matrix can be given:

$$T = \begin{pmatrix} r_{11} & r_{12} & r_{13} & P_x \\ r_{12} & r_{22} & r_{23} & P_y \\ r_{31} & r_{32} & r_{33} & P_z \\ l_x & l_y & l_z & S \end{pmatrix} \quad (6)$$

Incidentally, conversion parameters $r_{11}$ through $r_{33}$ used in the equations (4) and (5), are parameters for rotating an input image in a three dimensional space of an XYZ-coordinate system, $P_{0x}$, $P_{0y}$ and $P_{0z}$ denotes perspective values for the perspective conversion of the input image by applying a perspective method at the time of displaying the input image on the screen surface 16A, $l_x$, $l_y$ and $l_z$ are parameters for the parallel movement of the original points of the coordinate system in the direction of X-axis, Y-axis and Z-axis, and $S_0$ is a parameter (not enlarging and reducing according to the perspective method) for enlarging and reducing the input image.

In the pixel image information generating circuit 35 in the case of this embodiment, perspective values $P_{0x}$, $P_{0y}$ and $P_{0z}$ used for applying the perspective method in the equation (5) are set to a value such that the value of the following equation becomes a reference value:

$$P_{0x}=0, P_{0y}=0, P_{0z}=1/16 \quad (7)$$

As a result, the following equation means that the view of the operator is located at a position of −16 in the Z-coordinate:

$$(P_{0x},P_{0y},P_{0z})=(0,0,1/16) \quad (8)$$

Incidentally, the value of −16 in this coordinate is a value which is determined at random in this particular embodiment, and is not a particularly general value. In this embodiment, the coordinates of the screen monitor which constitutes the XY-surface are such that coordinate values of −4 through +4 are set on the X-axis, setting the center of the monitor screen as the origin point, and coordinate values −3 through +3 are imaginary, set on the Y-axis.

Next, since data read from the frame memory 33 and data displayed on the screen surface 16A is two dimensional data in the equation (6), the parameters in the third line and in the third column in the equation (6) are not needed at the time of calculating the two dimensional address. Consequently, the following matrix becomes a matrix for converting a two dimensional point (x, y) on the frame memory 33 into a point (xs, ys) on the screen surface 16A when a matrix excluding the parameters in the third line and in the third column is denoted by $T_{33}$ from the equation (6):

$$T_{33} = \begin{pmatrix} r_{11} & r_{12} & P_x \\ r_{21} & r_{22} & P_y \\ l_x & l_y & S \end{pmatrix} \quad (9)$$

Here, when the vector (x, y) on the frame memory 33 and the vector (xs ys) on the screen surface 16A are represented in the homogeneous coordinate system, the matrix can be represented as follows:

$$(xy) = (xyH)$$

$$(xsys) = (xsys\ 1) \quad (10)$$

Here, H is a value which represents an enlargement ratio and a reduction ratio of an image distorted by the perspective method. In the present embodiment, this value of H is used as pseudo depth information.

Returning again to the aforementioned equations (9) and (10), since the vector (xs ys 1) on the screen surface 16A is provided by allowing a conversion matrix $T_{33}$ to act on the vector (x y H) on the frame memory 33, the vector on the screen surface 16A is defined in the following equation:

$$(xsys\ 1) = (xyH)T_{33} \quad (11)$$

Figure 9:
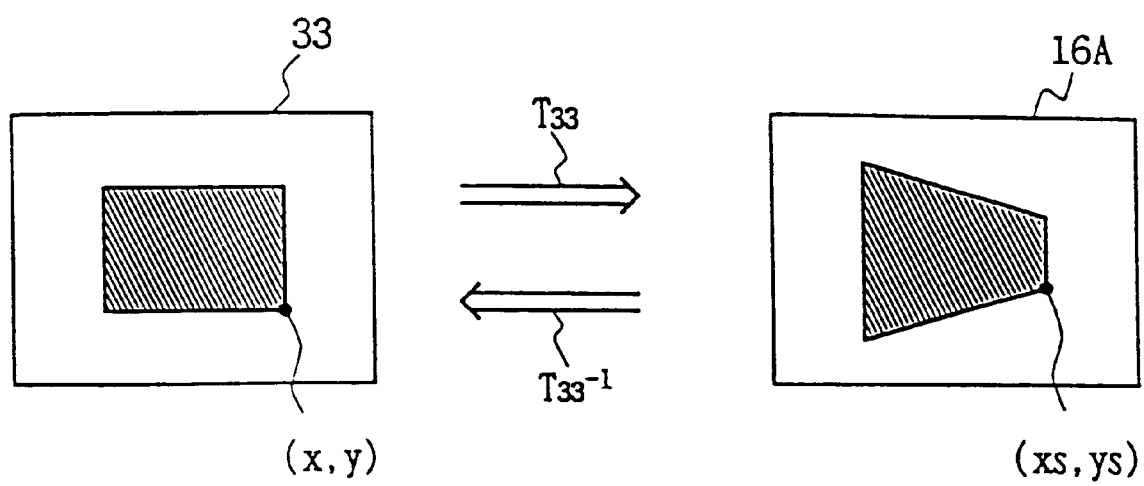
FIG. 9 is a schematic diagram showing a method of conversion and reverse conversion of a spatial address on a frame memory and a spatial address on a screen surface.

However, in the case where images are subjected to the spatial image conversion in the present embodiment, a three dimensional conversion is executed at the time of reading the video data $V_A$ from the frame memory 33, so it is required to specify the address on the frame memory with respect to the screen address which is sequentially supplied so as to correspond to the raster scan. Consequently, when the address (xs ys) on the screen surface 16A is designated in correspondence to the raster scan by executing calculation of the following equation, as can be seen from FIG. 9, the address (x, y) on the frame memory 33 is specified:

$$(xyH) = (xsys1)T_{33}^{-1} \quad (12)$$

Consequently, the two dimensional video data and a key signal can be obtained, which are subjected to spatial image conversion by supplying this two dimensional reading address (x, y) to the frame memory 33 and the key information memory 34.

Here, the matrix in the equation (9) will be considered:

$$T_{33} = \begin{pmatrix} r_{11} & r_{12} & P_x \\ r_{21} & r_{22} & P_y \\ l_x & l_y & S \end{pmatrix} = \begin{pmatrix} a_{11} & a_{12} & a_{13} \\ a_{21} & a_{22} & a_{23} \\ a_{31} & a_{32} & a_{33} \end{pmatrix} \quad (13)$$

$$T_{33}^{-1} = \begin{pmatrix} a_{11} & a_{12} & a_{13} \\ a_{21} & a_{22} & a_{23} \\ a_{31} & a_{32} & a_{33} \end{pmatrix}^{-1} = \begin{pmatrix} b_{11} & b_{12} & b_{13} \\ b_{21} & b_{22} & b_{23} \\ b_{31} & b_{32} & b_{33} \end{pmatrix}$$

$$T_{33}^{-1} = \begin{pmatrix} a_{11} & a_{12} & a_{13} \\ a_{21} & a_{22} & a_{23} \\ a_{31} & a_{32} & a_{33} \end{pmatrix}^{-1} = \begin{pmatrix} b_{11} & b_{12} & b_{13} \\ b_{21} & b_{22} & b_{23} \\ b_{31} & b_{32} & b_{33} \end{pmatrix}$$

Set the following equation:

$$b_{ij} = \frac{a_{ji}}{\det(T_{33})} \quad (14)$$

The following equation can be represented by substituting the equation (14) into equation (12):

$$(x\ y\ H) = (xs\ ys\ 1)T_{33}^{-1} \quad (15)$$

$$= (xs\ ys\ 1)\begin{pmatrix} b_{11} & b_{12} & b_{13} \\ b_{21} & b_{22} & b_{23} \\ b_{31} & b_{32} & b_{33} \end{pmatrix}$$

When equation (15) is developed, the following equation is provided:

$$(x\ y\ H) = (b_{11}xs + b_{21}ys + b_{31} \quad (16)$$

$$b_{12}xs + b_{22}ys + b_{32}$$

$$b_{13}xs + b_{23}ys + b_{33})$$

Consequently, a value of the following equation is calculated:

$$x = b_{11}xs + b_{21}ys + b_{31} \quad (17)$$

$$y = b_{12}xs + b_{22}ys + b_{32}$$

$$H = b_{13}xs + b_{23}ys + b_{33}$$

However, since the vector (x y H) on the frame memory 33 is a vector in the same coordinate system, the vector may be normalized with the parameter H to bring the parameter into the two dimensional coordinate system.

$$\frac{x}{H} = \frac{b_{11}xs + b_{21}ys + b_{31}}{b_{13}xs + b_{23}ys + b_{33}} \quad (18)$$

$$\frac{y}{H} = \frac{b_{12}xs + b_{22}ys + b_{32}}{b_{13}xs + b_{23}ys + b_{33}}$$

$$\frac{y}{H} = \frac{b_{12}xs + b_{22}ys + b_{32}}{b_{13}xs + b_{23}ys + b_{33}}$$

Thus, actually, in the image information generating circuit 35, address data (x, y) based on (x/H, y/H) is supplied to sequentially read data on a pixel corresponding to a screen address (xs, ys) from the frame memory 33 and the key information memory 34.

Next, the matrix equation $T_{33}^{-1}$ is solved with respect to the equation (14). Here, parameters $a_{11}$ through $a_{33}$ are determined as follows from equation (13):

$$a_{11} = r_{11}, a_{12} = r_{12}, a_{13} = P_x$$

$$a_{21} = r_{21}, r_{22} = r_{22}, a_{23} = P_y$$

$$a_{31} = l_x, a_{32} = l_y, a_{33} = S \quad (19)$$

Thus the following equations are obtained:

$$b_{11} = \frac{-l_y P_y + r_{22} S}{W1} \quad (20)$$

$$b_{12} = \frac{l_y P_x - r_{12} S}{W1}$$

$$b_{13} = \frac{-r_{22} P_x + r_{12} P_y}{W1}$$

$$b_{21} = \frac{l_x P_y - r_{21} S}{W1}$$

$$b_{22} = \frac{-l_x P_x + r_{11} S}{W1}$$

-continued $$b_{23} = \frac{r_{21}P_x - r_{11}P_y}{W1}$$

$$b_{31} = \frac{-r_{22}l_x + r_{21}l_y}{W1}$$

$$b_{32} = \frac{r_{12}l_x - r_{11}l_y}{W1}$$

$$b_{33} = \frac{-r_{12}r_{21} + r_{11}r_{22}}{W1}$$

$$W_1 = -r_{22}l_xP_x + r_{21}l_yP_x + r_{12}l_xP_y - r_{11}l_yP_y - r_{12}r_{21}S + r_{11}r_{22}S$$

$$b_{23} = \frac{r_{21}P_x - r_{11}P_y}{W1}$$

$$b_{31} = \frac{-r_{22}l_x + r_{21}l_y}{W1}$$

$$b_{32} = \frac{r_{12}l_x - r_{11}l_y}{W1}$$

$$b_{33} = \frac{-r_{12}r_{21} + r_{11}r_{22}}{W1}$$

$$W_1 = -r_{22}l_xP_x + r_{21}l_yP_x + r_{12}l_xP_y - r_{11}l_yP_y - r_{12}r_{21}S + r_{11}r_{22}S$$

Consequently, the parameter H as the depth information is determined based on equation (17) from the following equation:

$$H = b_{31} \cdot xs + b_{32} \cdot ys + b_{33} \quad (21)$$
$$= \frac{\{(-r_{22} \cdot l_x) + (r_{21} \cdot l_y)\}xs}{W2} + \frac{\{(r_{12} \cdot l_x) - (r_{11} \cdot l_y)\}ys}{W2} + \frac{(-r_{12} \cdot r_{21}) + (r_{11} \cdot r_{22})}{W2}$$

$$W2 = (-r_{22} \cdot l_x \cdot P_x) + (r_{21} \cdot l_y \cdot P_x) + (r_{12} \cdot l_x \cdot P_y) - (r_{11} \cdot l_y \cdot P_y) - (r_{12} \cdot r_{21} \cdot S) + (r_{11} \cdot r_{22} \cdot S)$$

Next, supposing that with a control parameter input from the control panel 14 by the operation of the operator, perspective values $P_{0x}$ and $P_{0y}$ relative to the perspective method out of the parameters of equation (4) are set as follows:

$$P_{0x}=0 \text{ and } P_{0y}=0 \quad (22)$$

and at the same time, the enlargement ratio and the reduction ratio $S_0$ is set as follows:

$$S_0=1 \quad (23)$$

the following equations are found from equation (5):

$$P_x=r_{13}P_{0z}$$
$$P_y=r_{23}P_{0z}$$
$$S=l_zP_{0z}+1 \quad (24)$$

Here, the values of equations (22) and (23) are set to simplify the equations described later. In addition, in actual operation, $P_{0x}=0$ and $P_{0y}=0$ and $S_0=1$ are set in many cases.

When the parameters and a value of s are substituted into equation (20), the following equation is found:

$$H = \frac{\{(-r_{22}l_x) + (r_{21}l_y)\}xs}{W3} + \frac{\{(r_{12}l_x) - (r_{11}l_y)\}ys}{W3} + \frac{\{(-r_{12}r_{21}) - (r_{11}r_{22})\}}{W3} \quad (25)$$

$$W3 = -r_{22}l_xr_{13}P_{0z} + r_{21}l_yr_{13}P_{0z} + r_{12}l_xr_{23}P_{0z} - r_{11}l_yr_{23}P_{0z} - r_{12}r_{21}(l_zP_{0z} + 1) + r_{11}r_{22}(l_zP_{0z} + 1)$$

In the aforementioned embodiment, the values of the parameters H which are determined by the equation (25) are used as depth information. This is because the Z-coordinate value of the actual three dimensional space at the time of three dimensional conversion is proportional to the value of H.

In this manner, the following advantage is provided by using the value of H instead of using the actual Z-coordinate value for three dimensions as the depth information. In the case of calculating the depth information, there is no need to calculate the Z-coordinate value so that the portion of the calculation for one dimension can be omitted. Consequently, there is no need to use a high-speed processor for three dimensional conversion. The depth information can be calculated even when a slow speed processor is used. Furthermore, this H is regarded as a value which is needed at the time of calculating a two dimensional reading address supplied to the frame memory 33 and the key information memory 34. Consequently, to determine H, there is no need to execute a specific calculation. Thus, high-speed calculation can be executed.

Figure 10B:
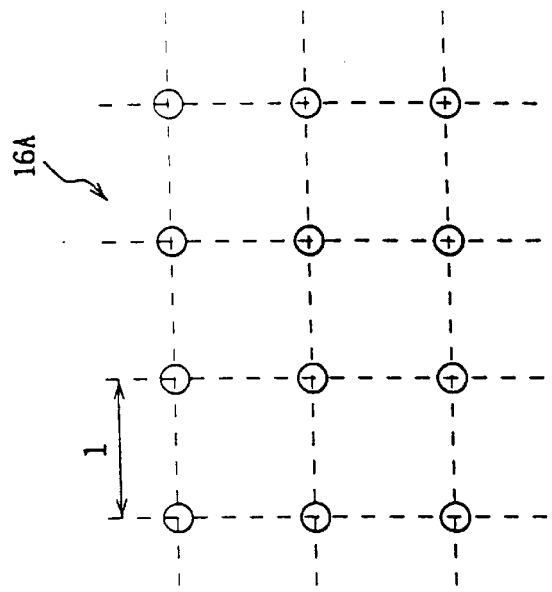
FIGS. 10(A) and (B) are schematic diagrams explaining the meaning of a value of depth information in the relation between an address space of a frame memory and an address space on the screen surface.
Figure 10A:
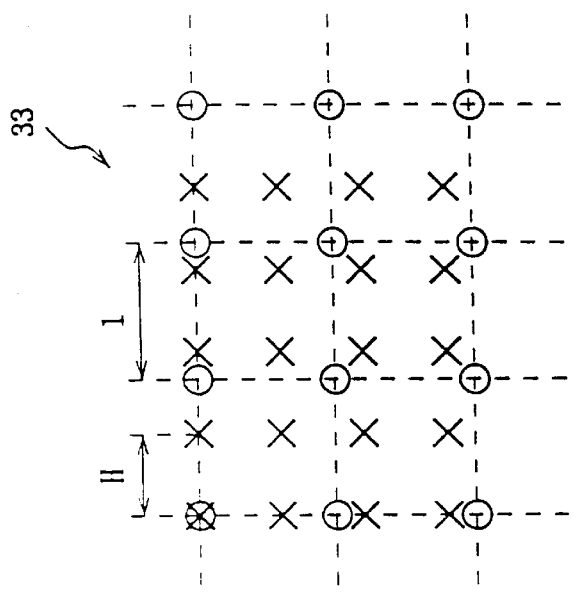

The parameter H determined in this manner means that the space for the reading space sampling address (x, y) of the frame memory 33 is "H" as shown in FIG. 10(B) when the space of the space sampling address (xs, ys) (thus, the space between pixels on the screen surface 16A) on the screen surface 16A is set to "1".

Then, when the parameter value H as the depth information $H_A$ becomes larger, the value of the reading address (x/H, y/H) of the frame memory 33 normalized in the equation (18) becomes smaller. When the space of the reading address of the frame memory 33 becomes smaller in this manner, the number of pixels on the frame memory 33 becomes larger so that the image produced on the screen surface 16A is enlarged.

On the other hand, when the parameter H becomes smaller, the aforementioned fact means that the normalized reading address (x/H, y/H) becomes larger so that the space of the spatial reading sampling address of the frame memory 33 becomes larger. However, when the space of the spatial sampling address becomes larger, the image which is produced will be reduced at the time of displaying data read from the frame memory 33 on the screen surface 16A.

Figure 11A:
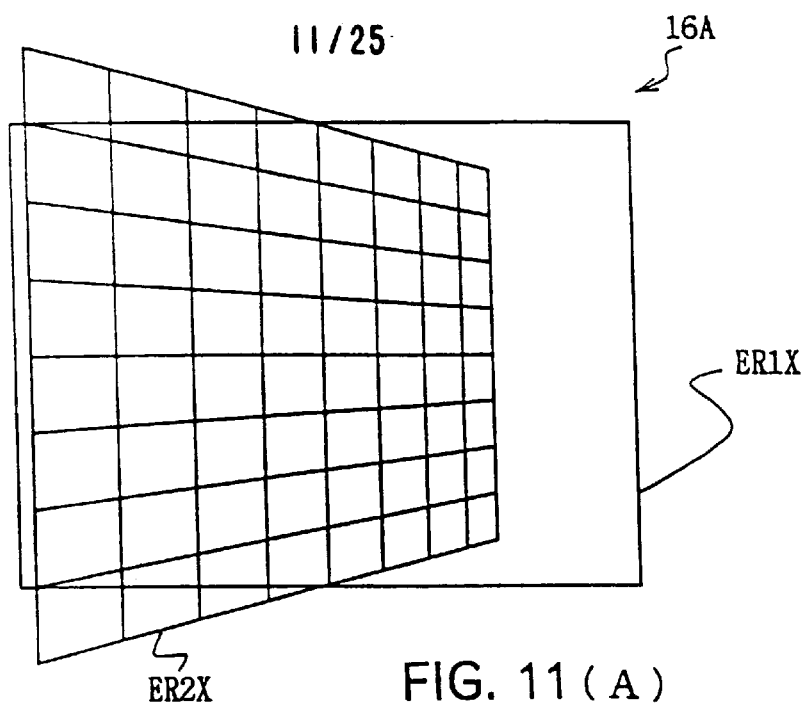
FIGS. 11(A) and (B) are schematic diagrams explaining address method in a perspective method.
Figure 11B:
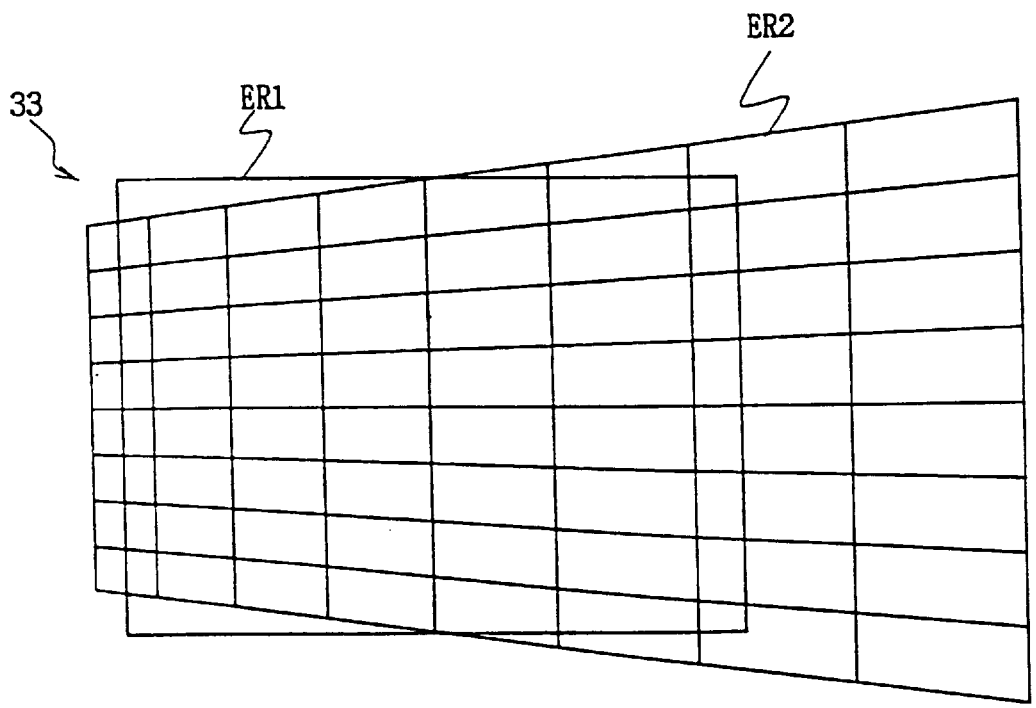
Figure 12:
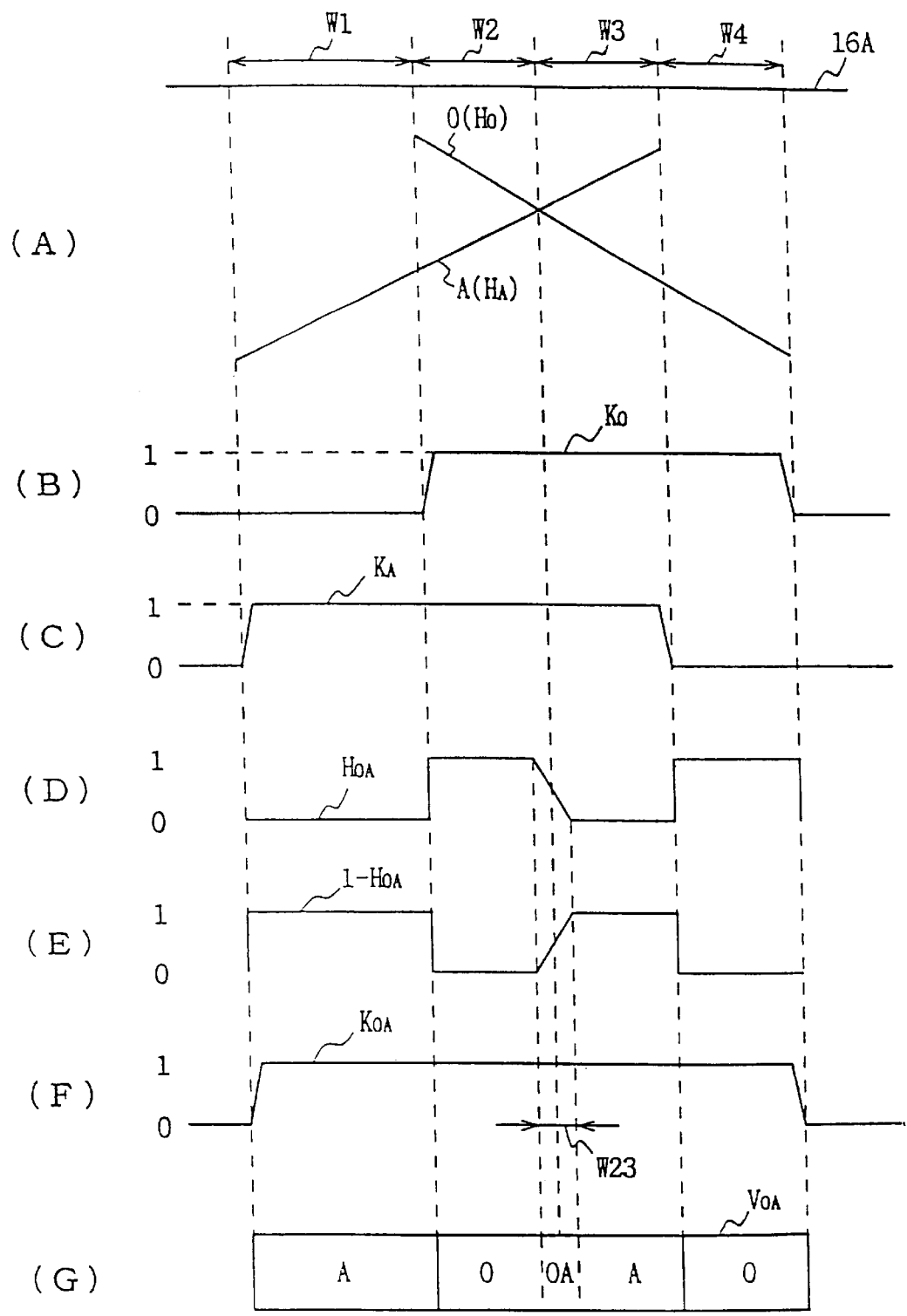
FIGS. 12(A) to (G) are signal waveform views explaining synthesis processing of two images which intersect each other.

For example, as shown in FIG. 11(B), when the image data is read with the reading address of an area ER2 in which the parameter H is set differently in accordance with the perspective method so that the image data intersects the memory area ER1 specified without using the perspective method in the address space of the frame memory 33, as shown in FIG. 11(A), the image data read from the area ER1 of the frame memory 33 without using the perspective method is read with a reading sampling address which is determined using the same parameter H without using the perspective method so that the image produced on the screen surface 16A is displayed in an area ER1X as an image which is not produced by the perspective method.

On the other hand, the image data having pixel data of the frame memory 33 read with the perspective method from an area ER2 having a different spatial reading sample becomes image data which is reduced on the screen surface 16A where the reading sampling addresses have a large parameter H and at the same time the parameter H becomes smaller, with the result that the image on the screen surface 16A is reduced in the areas where the reading sampling address become larger.

In this manner, the parameter H allows an image using the perspective method to be produced on the screen surface 16A by allowing the change in size to serve as the depth information.

Next, the combiner 22 of the first channel special effect processing part 12 will be explained by referring to FIGS. 12(A) to (G). The combiner 22 of the first channel special effect processing part 12 performs the keying of the two types of image information, namely video data $V_O$ and $V_A$ of the two images O and B intersecting each other while diagonally extending to have depth information $H_O$ and $H_A$, in the XYZ space at the rear of the screen surface 16A shown in FIG. 12(A) with two key signals $K_O$ (FIG. 12(A)) and $K_A$ (FIG. 12(C)). At the same time, the combiner 22 synthesizes the two types of image information by using the structure shown in FIG. 13 on the basis of (FIGS. 12(D) and (E)), the priority signals $H_{OA}$ and $(1-H_{OA})$ of each part of the two images O and B. Here, the depth information $H_O$ and $H_A$ are values which are determined by the equation (25) which is previously explained. Moreover, the priority signal $H_{OA}$ refers to information for representing the priority of the display of the video signal O with respect to the video signal A. For example, the video signal A is not displayed at all when the priority of the video signal O is 100% at the time of $H_{OA}=1$. In other words, it is possible to say that the video signal O is opaque. At the time of $H_{OA}=0.5$, the video signal O is semi-transparent, and the video signal O is displayed in a transparent manner. In other words, the video signal O is displayed 50% and the video signal A is displayed 50% so that a video signal is displayed in which the video signal O and the video signal A are mixed.

Figure 13:
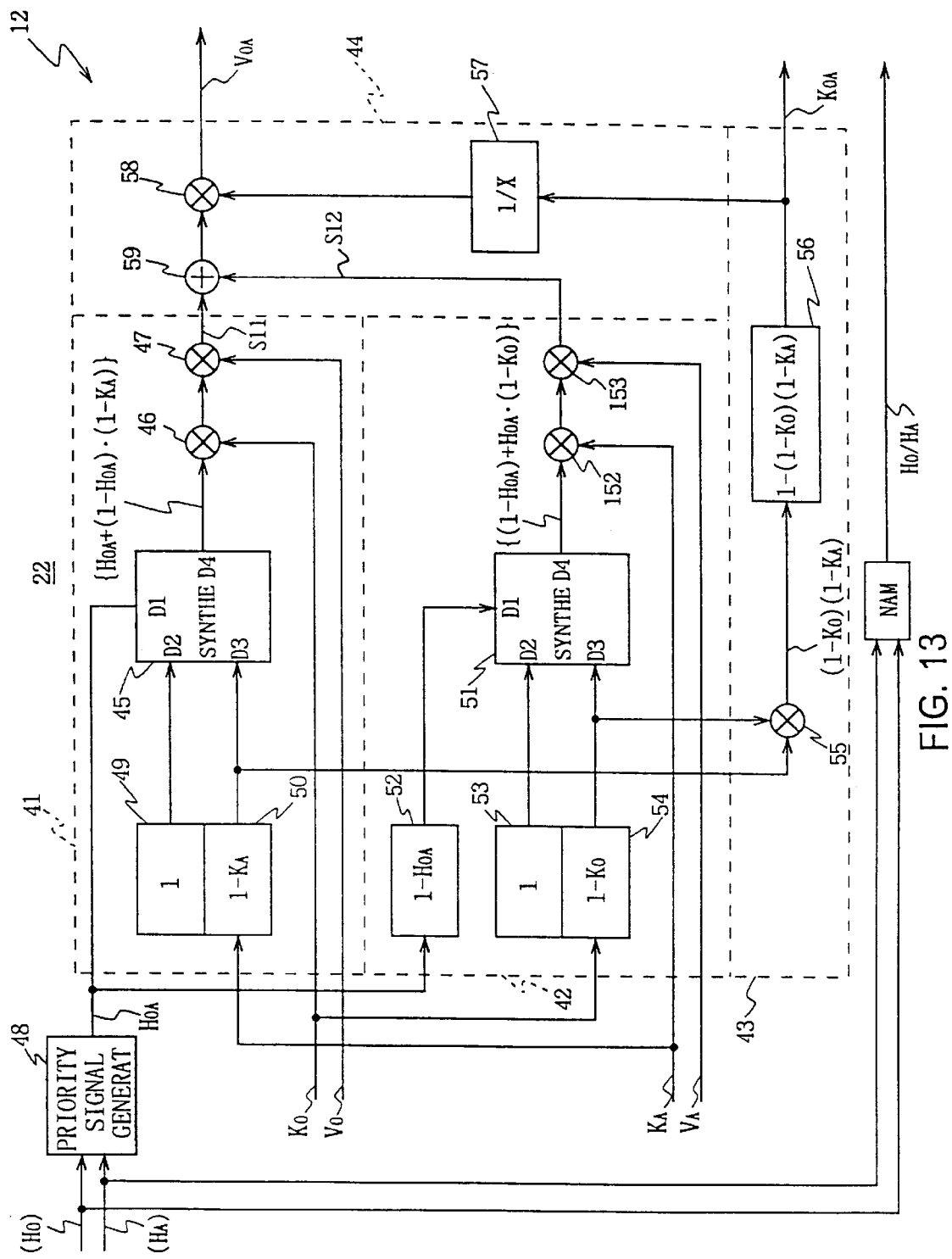
FIG. 13 is a block diagram showing a detailed structure of a combiner of a first channel special effect processing part.

In FIG. 13, the combiner 22 has a first image signal synthesizing part 41 for calculating the synthesis ratio of the video data $V_O$ of the first image, a second signal synthesizing part 42 for calculating the synthesis ratio of the second image, a key signal synthesizing part 43 for forming a key signal with respect to the two images O and A, and a synthesis output part 44 for outputting two image signals by synthesizing the two images.

The first image signal synthesizing part 41 obtains a synthesis output S11 by multiplying the key signal $K_O$ and the video signal $V_O$ respectively in multiplication circuits 46 and 47 with respect to the output data D4 which is obtained by calculating the following equation on the basis of the first, second, and third input data D1, D2 and D3.

$$D4=D1 \times D2+(1-D1) \times D3 \qquad (26)$$

Here, the depth information $H_{OA}$ of the depth information generating circuit 48 is given as a first input D1 of the synthesizing circuit 45 and an output of "1" of a constant circuit 49 is given as a second input data D2, and an output of "$1-K_A$" of the constant circuit 50 is given as a third input data D3.

Thus, from the first image signal synthesizing part 41, a synthesis output data S11 is obtained which is represented by the following equation:

$$S11=\{H_{OA} \cdot 1+(1-H_{OA})(1-K_A)\}K_O \cdot V_O \qquad (27)$$

Moreover, the second image signal synthesizing part 42 has a synthesizing part 51 for executing the calculation of the equation (26) so that the key signal $K_A$ and the video signal $V_A$ are subsequently multiplied by the output data D4 in the multiplying circuits 152 and 153.

In this case, an output "$1-H_{OA}$" of the "$1-H_{OA}$" constant circuit 52 is given as the first input data D1 of the synthesizing circuit 51, an output of "1" constant output of the "1" constant circuit 53 is given as the second input data D2, and further, an output of "$1-K_O$" of the "$1-K_O$" constant circuit 54 is given as the third input data D3.

Thus, as a synthesis output data S12 of the second image signal synthesizing part 42 the following calculation data is obtained using the following formula:

$$S12=\{(1-H_{OA}) \cdot 1+H_{OA}(1-K_O)\}K_A \cdot V_A \qquad (28)$$

Furthermore, the key signal synthesizing part 43 multiplies the output of "$1-K_A$" of the "$1-K_A$" constant circuit 50 by an output of "$1-K_O$" of the "$1-K_O$" constant circuit 53 which is then input to the "$1-(1-K_O)(1-K_A)$" calculating circuit 56, so that an output thereof is sent from the combiner 22 as a key signal $K_{Oa}$ represented by the following equation:

$$K_{OA}=1-(1-K_A)(1-K_O) \qquad (29)$$

Furthermore, the synthesizing output part 44 converts the output of "$1-(1-K_O)(1-K_A)$" into a fraction in a reverse circuit 57 to be given to the multiplying circuit 58 so that the output is multiplied by the addition output of the adding circuit 59 to be output from the combiner 22 as a synthesized video output $V_{OA}$.

The synthesis output data S11 and S12 of the first and the second image signal synthesizing parts 41 and 42 are given to an adding circuit 59 so that the synthesis video data $V_{OA}$ becomes a value represented by the following equation:

$$V_{OA} = (\{H_{OA}K_O + (1-H_{OA})(1-K_A)K_O\}V_O + \qquad (30)$$
$$\{(1-H_{OA})K_A + H_{OA}(1-K_O)K_A\}V_A) \times$$
$$\frac{1}{1-(1-K_A)(1-K_O)}$$

In this manner, the combiner 22 for outputting the synthesis output video signal $V_{OA}$ is structured on the basis of the following synthesis theory.

An explanation will be made with respect to a case in which the two video signals $V_O$ and $V_A$ are to be generally synthesized in accordance with a priority order which is determined by the depth information $H_{OA}$ on the basis of the key signals $K_O$ and $K_A$ respectively. A synthesis equation in the case where the second video signal $V_A$ is located on top of the first video signal $V_O$ is represented by the following equation:

$$V_{O(OUT)}=K_O V_O+(1-K_O)K_A V_A \qquad (31)$$

As a consequence, a synthesis output of $V_{O(OUT)}$ or the like can be obtained.

In the same manner, when the second video signal $V_A$ is located on top of the first video signal $V_O$ (or in the vicinity of the first video signal $V_O$), the synthesis equation can be represented by the following equation:

$$V_{A(OUT)}=K_A V_A+(1-K_A)K_O V_O \qquad (32)$$

As a consequence, a synthesis output of $V_{A(OUT)}$ or the like can be obtained.

When the priority signal $H_{OA}$ is considered with respect to the synthesis video signal $V_{O(OUT)}$ in the case where the second video signal $V_A$ is located on top of the first video signal $V_O$, the synthesis video signal corresponding to the first video signal can be represented by the following equation:

$$V_{O(OUT)X} = V_{O(OUT)} H_{OA} \quad (33)$$

Then the following equation can be obtained by substituting the equation (31) into the equation (33):

$$V_{O(OUT)X} = \{K_O V_O + (1-K_O) K_A V_A\} H_{OA} \quad (34)$$

The priority signal given when the first image signal $V_O$ is located on top of the second image signal can be represented as $(1-H_{OA})$ by using the priority signal $H_{OA}$. Consequently, in consideration of the priority signal $(1-H_{OA})$ with respect to $V_{A(out)}$ when the first image signal $V_O$ is located on top of the second image signal $V_A$, the output of $V_A$ can be represented by the following equation:

$$V_{A(OUT)X} = V_{A(OUT)}(1-H_{OA}) \quad (35)$$

Then the following equation can be represented by substituting the equation (32) into the equation (35):

$$V_{A(OUT)X} = \{K_A V_A + (1-K_A) K_O V_O\}(1-H_{OA}) \quad (36)$$

Then the final video output $V_{OUT}$ is subjected to key processing with the key signal $K_{OUT}$ as synthesized as follows:

$$V_{OUT} K_{OUT} = V_{O(OUT)X} + V_{A(OUT)X} \quad (37)$$

Thus, the synthesized video output which is finally output can be obtained as represented by the following equation:

$$V_{OUT} = \frac{V_{O(OUT)X} + V_{A(OUT)X}}{K_{OUT}} \quad (38)$$

By the way, since an area other than the areas in which an image is displayed corresponding to the first and the second video signals $V_O$ and $V_A$ (namely, an area where neither of the video signals $V_O$ and $V_A$ is displayed) can be defined in a form of a product such as $(1-K_O)(1-K_A)$ by using the key signals $K_O$ and $K_A$ of the first and the second video signals $V_O$ and $V_A$, a key signal $K_{OUT}$ with respect to an area where either of the video signals $V_O$ and $V_A$ is displayed is expressed by the following equation:

$$K_{OUT} = 1-(1-K_O)(1-K_A) \quad (39)$$

Consequently, when the equations (34) and (36) and (39) are substituted into the equation (38), the synthesized video output $V_{OUT}$ which is finally obtained can be represented by the following equation:

$$V_{OUT} = (\{K_O V_O + (1-K_O) K_A V_A\} H_{OA} + \quad (40)$$
$$\{K_A V_A + (1-K_A) V_O V_O\}(1-H_{OA})) \times$$
$$\frac{1}{1-(1-K_O)(1-K_A)}$$
$$= (\{H_{OA} K_O + (1-H_{OA})(1-K_A) K_O\} V_O +$$
$$\{(1-H_{OA}) K_A + H_{OA}(1-K_O) K_A\} V_A) \times$$
$$\frac{1}{1-(1-K_O)(1-K_A)}$$

The synthesized video output equation represented by the equation (40) which is theoretically determined in this manner is the same as the synthesized video output $V_{OA}$ of the equation (30) which is obtained in the combiner 22 of FIG. 13. Thus, it is possible to say that the combiner 22 executes the synthesis theory of the equations (31) through (40).

When the first and the second images O and A intersect each other while retaining the depth information $H_O$ and $H_A$ as shown in FIG. 12(A) in the combiner 22 of FIG. 13, the video signals $V_O$ and $V_A$ representative of the first and the second video signals O and A are subjected to key processing with key signals $K_O$ and $K_A$.

The depth information Ho of the image O allows a priority signal $H_{OA}$ (FIG. 12(D)) to be generated in the priority signal generating circuit, the priority signal $H_{OA}$ serving to output the first video signal $V_O$ in range W1 and W4 in which the image O has depth information $H_O$ which is nearer to the screen surface 16A.

On the other hand, the priority signal is found as $(1-H_{OA})$ (shown in FIG. 12(E)) for the priority signal serving to output a second video signal $V_A$ in the range W1 and W3 in which the image A has depth information $H_A$ located at a position nearer to the screen surface 16A than the image O.

In this manner, the image O is produced on the screen surface 16A in the range of a high priority such as the image O shown in FIG. 12(G) as a synthesized video signal $V_{OA}$. At the same time, the second image is displayed on the screen surface 16A in the ranges of W1 and W3 where the second image A has a high priority.

Figure 14:
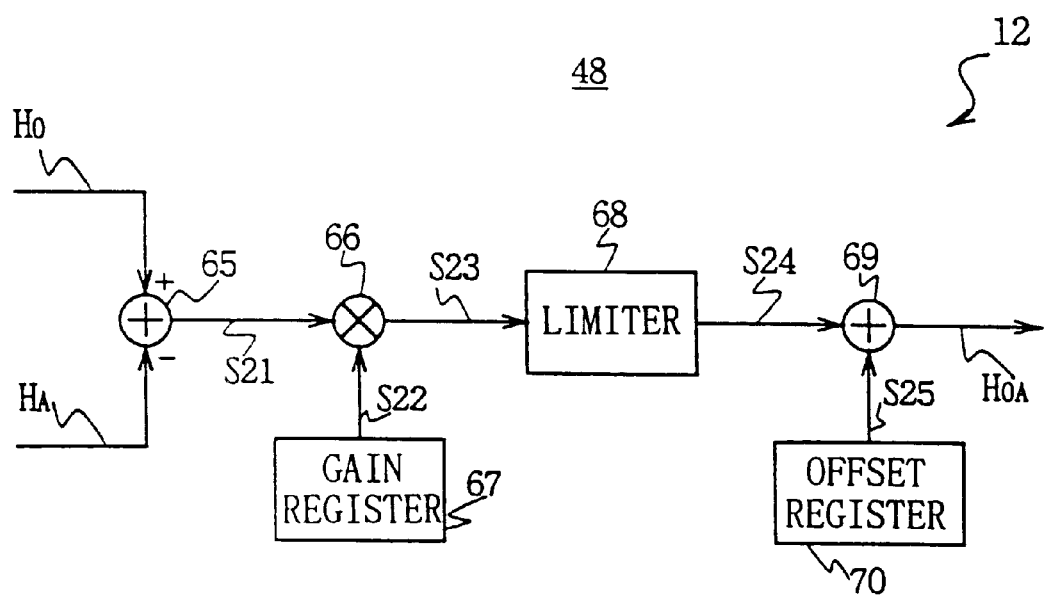
FIG. 14 is a block diagram showing detailed structure of a priority signal generating circuit of FIG. 13.

Next, an explanation will be given with respect to this priority signal. In the case of this embodiment, as shown in FIG. 14, the priority signal generating circuit 48 receives at a subtraction circuit 65 the depth information $H_O$ and $H_A$ (FIG. 15(A)) of the first and the second video signals $V_O$ and $V_A$ input as the first and the second image information P1 and P2 (FIG. 8). Then after the subtraction output S21 $(=H_{O-HA})$ (FIG. 15(B)) is multiplied by a gain signal S22 $(=G)$ which is supplied from a gain register 67 in the multiplication circuit 66, the multiplication output S23 is $(=(H_{O-HA})G)$ (FIG. 15(B)) is given to a limiter 68.

Figure 15:
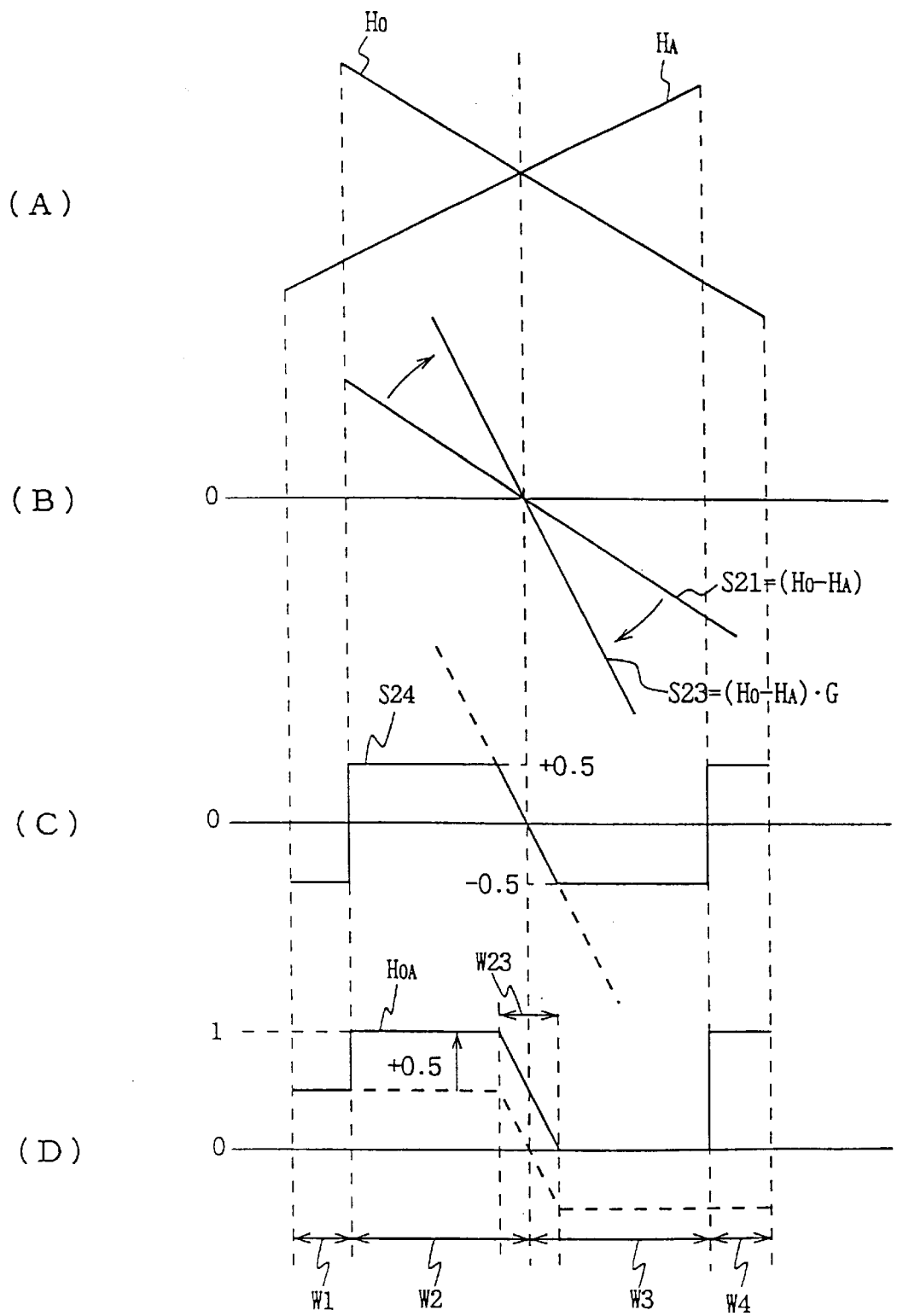
FIGS. 15(A) to (D) are signal waveform views explaining an operation of a priority signal generating circuit of FIG. 14.

Here, as shown in FIG. 15(B), the gain signal S22 $(=G)$ has the function of changing the slope (that is, the rate of change of the synthesis depth ratio) of the subtraction output $(H_O-H_A)$.

The limiter 68, as shown in FIG. 15(C), limits the value of the multiplication output S23 to a range of +0.5 through −0.5. Thus, in a range where the depth information difference is large, the level is set to +0.5 to −0.5. At the same time, when the depth information difference is set to +0.5 to −0.5, the limiter output S24 assumes a value of $(H_{O-HA})G$.

An offset signal S25 $(=L_O)$ provided from an offset register 70 in the addition circuit 69 is added to the limiter output S24. Then the addition output is output from the priority signal generating circuit 48 as a priority signal $H_{OA}$ which assumes a value which can be converted into a range of 1 to 0 as shown in FIG. 14(D).

In the priority signal generating circuit 48 of FIG. 14, when the first and the second images O and A intersect each other, the priority signal $H_{OA}$ changes in accordance with a slope having a size corresponding to the difference between the depth information $H_O$ and $H_A$ of the priority signal $H_{OA}$ in the range W23 (FIG. 15(D)) in the vicinity of the point where the two images intersect each other at the crossing point of the two images.

Consequently, since the priority signal does not abruptly change over to 1 to 0 in the range W23 located in the vicinity of the crossing point where the two images intersect each other, the image in the vicinity range W23 assumes a transparent state such that the two images O and A mutually overlap each other (FIG. 12(G)). In other words, since the image O and an image trace thereof are displayed in a mixed manner, the mixture ratio of the image O and the image A gradually changes in the vicinity where the image O and the image A intersect each other so that an image free of an sense of awkwardness can be provided in the vicinity of the intersection of the image O and the image A.

Thus, an advantage for the special effect image can be obtained wherein the images O and A softly change in the range W23 in the vicinity of the crossing point of the first and the second images O and A. Moreover, the manner in which the width of the boundary area and the image changes can be adjusted to a degree required by the operator by adjusting the value of the gain output S22 of the gain register 67.

The combiner 22 has a depth information synthesizing circuit 151 having a structure with an NAM mix circuit to select the depth information of the images O and A (representative of the position of the image in the vicinity of the screen surface 16A) and to output the depth information as the synthesized depth information $H_O/H_A$ from the combiner 22.

Next, a residual image generating circuit 23 will be explained by referring to FIG. 16. The residual image generating circuit 23 has a key signal circuit 75, a video signal circuit 76 and a depth signal circuit 77. The synthesis key signal KOA of the combiner 22 (FIG. 13) in the key signal circuit 75 is compared with a memory key signal S20 in the comparison circuit 81A of the NAM mix circuit 81 so that the comparison output and S21 send out a signal having a larger frequency out of the synthesis key signal $K_{OA}$ and the memory key signal S20 from the key signal circuit 75 as an output key signal $K_{OAT}$ through the switching circuit 81B by changing over and controlling a switching circuit 81B on the basis of comparison. At the same time, the signal is memorized in the frame memory 82.

The frame memory 82 writes an output key signal $K_{OAT}$ output from the NAM mix circuit 81 with respect to each pixel of one image along with a reference clock signal CL followed by reading the output key signal $K_{OAT}$ as a frame reading signal S22 from the NAM mix circuit after a cycle of one frame.

After the frame reading signal S22 is multiplied by a frequency reduction constant signal S23 comprising a constant smaller than "1" in a frequency reduction circuit 83 having the structure of a multiplication circuit, the frame reading signal S22 is multiplied by an output S24 from a random noise generating circuit 85 in the multiplication circuit 84 to be given to a comparison circuit 81A of the NAM mix circuit 81 as a memory key signal S20.

Thus, when as a synthesis key signal $K_{OA}$, a key signal is input which corresponds to a static image such as the fixed plate B of FIG. 7 the said synthesis key signal $K_{OA}$ is selected in the NAM mix circuit 81 so that the key signal is output as an output key signal $K_{OAT}$ and is memorized in the frame memory 82.

Thus, when the key signal corresponding to a static image memorized in the frame memory 82 is read after a cycle of one frame, the frequency is reduced in the frequency reduction circuit 83 followed by being given to the NAM mix circuit 81 as the memory key signal S20. Since the frequency of the memory key signal S20 is smaller than the synthesis key signal $K_{OA}$ corresponding to the static image, the input synthesis key signal $K_{OA}$ is subsequently selected in the NAM mix circuit 81 so that the synthesis signal $K_{OA}$ is output as an output key signal $K_{OAT}$ and at the same time the signal is rewritten in the frame memory 82.

Thus, when a synthesis key signal $K_{OA}$ is input which corresponds to the static image, the synthesis key signal $K_{OA}$ is sent as an output key signal $K_{OAT}$ without change.

On the other hand, when a synthesis key signal $K_{OA}$ corresponding to a moving image is input, such as the image of the moving body A of FIG. 7, the synthesis key signal $K_{OA}$ is larger than the memory key signal S20 at the initial timing input to the frame memory 82, with the result that the synthesis key signal $K_{OA}$ corresponding to the first timing of the moving image is written in the frame memory 82.

Thus, a key signal corresponding to one frame portion of the image is written in the frame memory 82 at the timing at which the video signal of the moving image is initially input to the residual image generating circuit.

After the key signal written in the frame memory 82 is read in a cycle of one frame and the frequency of the key signal is reduced in the frequency reduction circuit 83, the key signal is given to the NAM mix circuit 81. However, at the timing after the lapse of one frame, the timing at which the synthesis key signal $K_{OA}$ corresponding to the moving image is input is shifted, so that the NAM mix circuit 81 judges that the memory key signal S20 is larger so as to output the memory key signal S20 as an output key signal $K_{OAT}$ and at the same time to rewrite the signal S20 in the frame memory 82.

Thus, a key signal corresponding to a part where the image moves during a cycle of one frame is rewritten as a key signal corresponding to a residual image in the frame memory 92 in a frequency reduced in the frequency reducing circuit 82.

Soon, when a synthesis key signal $K_{OA}$ corresponding to the image which has moved is input, the frequency will be reduced by the degree to which the memory key signal S20 has a frequency reduced in the frequency reduction circuit 83. As a consequence, the NAM mix circuit 81 outputs a synthesis key signal $K_{OA}$ as an output key signal $K_{OAT}$ and writes the synthesis key signal $K_{OA}$ in the frame memory 82.

Figure 17:
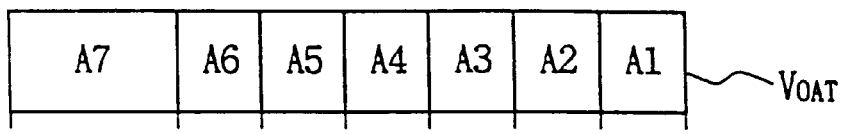
FIGS. 17(A) to (C) are schematic diagrams explaining an operation of a residual image of FIG. 16.
Figure 17:
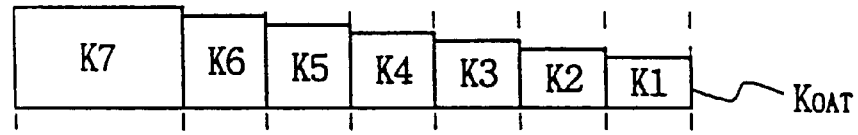
Figure 17:
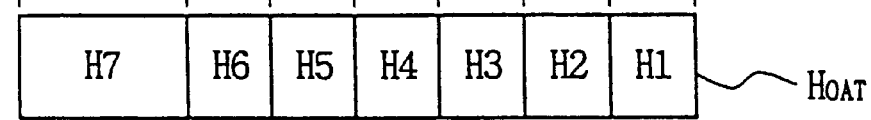

Such an operation is repeated for each cycle so that the key signal corresponding to a part where the image moves is rewritten in the frame memory 82 in a repeated manner at a reduced frequency according to the frequency reduction circuit 83. As shown in FIG. 17(B), in the frame memory 82, an output key signal $K_{OAT}$ is sent out from the key signal circuit 75, the signal having a key signal of the residual image with respect to the image with the attached residual image, such that the frequency gradually lowers (thus, the image subjected to the keying processing becomes thinner) in accordance with a lapse of time with respect to a keying signal corresponding to the current image.

In addition to this, in the case of the embodiment, a random noise is mixed into the memory key signal S20 with an output S24 of the random noise generating circuit 85 with the result that a fine noise is mixed into the residual image part, and an image can be generated which can provide a soft image which is subjected to keying processing with an output key signal including the noise.

The video signal circuit 76 of the residual image generating circuit 23 has a frame memory 91 which is written, read and operated using the reference clock signal in the same manner as the frame memory 82 of the key signal circuit 75 so that the video signal read at the output end is given to the switching circuit 92 as the memory video signal S25.

A synthesis video signal $V_{OA}$ of the combiner 22 is given to the switching circuit 92 so that the switching circuit 92 is switched over and controlled with a comparison output S21 which is obtained in the NAM mix circuit 81 of the key signal circuit 75, with the result that the synthesis key signal $K_{OA}$ is output as an output video signal $V_{OAT}$ via the switching circuit 92 at a timing larger than the memory key signal S20 while writing the synthesis key signal $K_{OAT}$ in the frame memory 91 as the current image.

On the other hand, the comparison output S21 of the NAM mix circuit 81 outputs the memory video signal S25 read from the frame memory 91 via the switching circuit 92, as a output video signal $V_{OAT}$, at the time of selecting the memory key signal S20 (that is, at the time of writing the key signal corresponding to the residual image part to the frame memory 82) while performing a cyclic movement which allows the memory video signal to be rewritten in the frame memory 91.

Thus, as shown in FIG. 17(A) the video signal is written in the frame memory 91 at the time at which the current image A7 is input as the synthesis video signal $V_{OA}$ while the video signal corresponding to the images A6 through A1 of the residual parts outputs the output video signal $V_{OAT}$ while repeating the reading and writing operation of the frame memory 91 at the cycle of the frame.

The depth information circuit 77 has a frame memory 95 which performs the reading and writing operation in synchronization with the frame memory 82 using the reference clock signal CL, which provides the depth information read from the frame memory 95 to the switching circuit 96 as the memory depth signal S31.

The synthesis depth information $H_O/H_A$ of the depth information $H_O$ and the depth information $H_A$ is supplied from the combiner 22 so that the synthesis key signal $K_{OA}$ forms a wave in a waveform forming circuit 97 to control the switching circuit 96 as a switching control signal S32, with the result that the synthesis depth signal $H_O/H_A$ is output as the output depth signal $H_{OAT}$ through the switching circuit 96 to write the synthesis depth signal $H_O/H_A$ into the frame memory every time the synthesis key signal $K_{OA}$ rises.

Thus, in the case where the output video signal $V_{OAT}$ (FIG. 17(A)) has the residual images A6 through A1 with respect to the current image A7, the depth signal circuit 77 generates depth information H7 and H6 through H1 corresponding to the image A7 and residual images A6 through A1 respectively as shown in FIG. 17(C).

In addition, at the time at which the synthesis key signal $K_{OA}$ rises, the memory depth signal S31 read from the frame memory 95 is output as an output depth signal $H_{OAT}$ through the switching circuit 96 while rewriting the memory depth signal S31 into the frame memory 95. Thus, once the synthesis depth signal $H_O/H_A$ is written in the frame memory 95, the depth information of one frame portion is held in the frame memory 95 until the synthesis depth information is held in the frame memory 95.

In this embodiment, a switching circuit 98 is provided in the path for outputting the output depth signal $H_{OAT}$ from the switching circuit 96. By giving the output key signal $K_{OAT}$ of a key signal circuit 75 as the switching control signal S33 to the switching circuit 98 via a waveform forming circuit 99, the depth signal written in the frame memory 95 is output as an output depth signal $H_{OAT}$ via a switching circuit 98 in a state in which the output key signal $K_{OAT}$ is output from the key signal circuit 75. On the other hand, at the time at which the output key signal $K_{OAT}$ of the key signal circuit 75 falls, the "0" signal S34 of the "0" signal source 100 is sent as an output depth signal $H_{OAT}$ via the switching circuit 98 so that a "0" signal (this signal means that the depth information is infinite) is sent out so that no disorder is generated in the rear column circuit.

Figure 18:
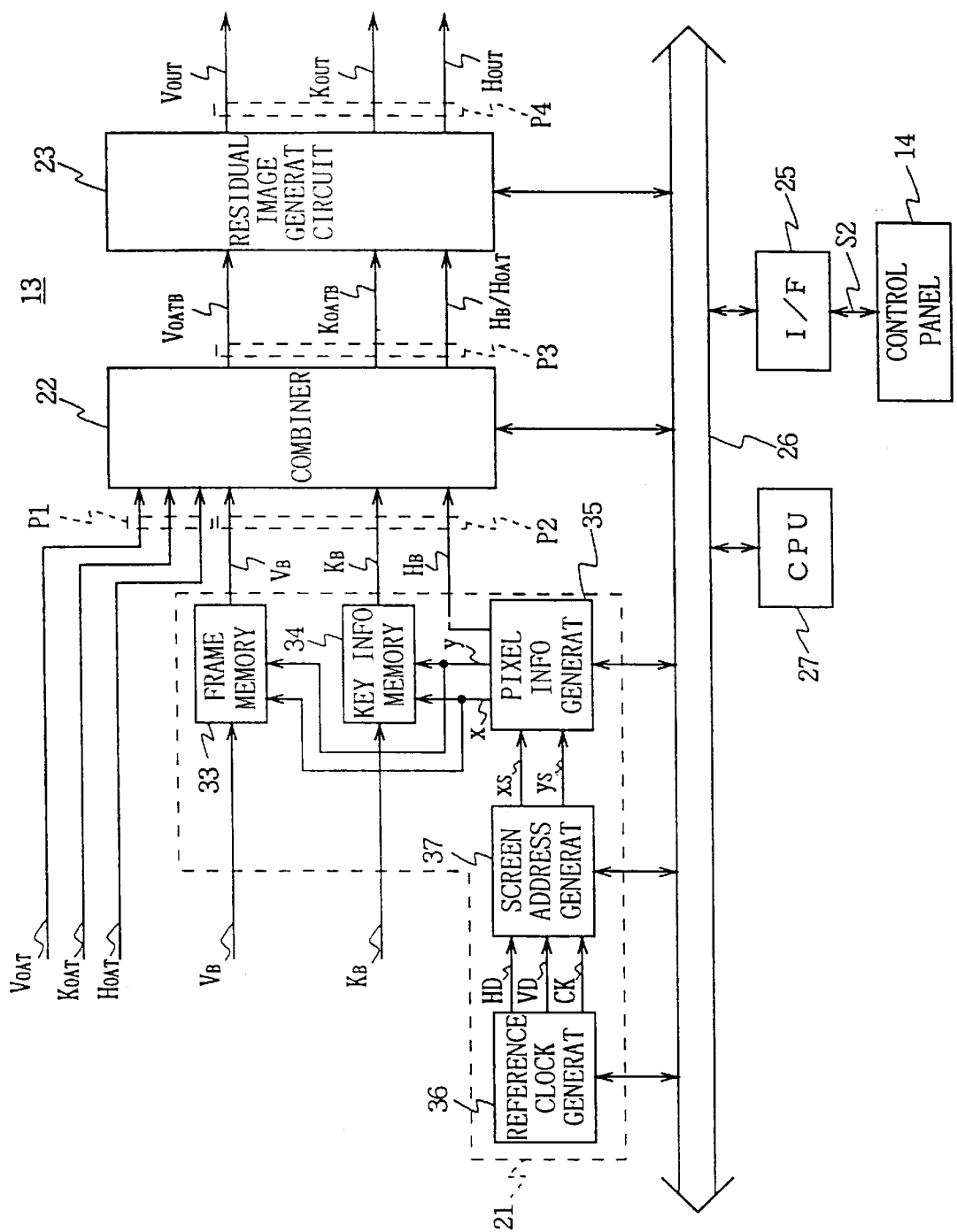
FIG. 18 is a block diagram showing a second channel special effect processing part.

The second channel special effect processing part 13 (FIG. 5) adds the same code to the corresponding part of FIG. 8 and has the same structure as the first channel special effect processing part 12 as shown in FIG. 18. At the same time the second special effect processing part 13 is different from the first special effect processing part 12 in that at the point when an output video signal $V_{OAT}$, an output key signal $K_{OAT}$ and the output depth signal $H_{OAT}$ obtained from the residual image generating circuit 23 of the first channel special effect processing part 12 are output as the first image information P1, video data $V_B$ and key data $K_B$ are input with respect to the image of the fixed plate B of FIGS. 6 and 7 and, at the same time, the depth information $H_B$ is obtained from the pixel information generating circuit 35.

Figure 19:
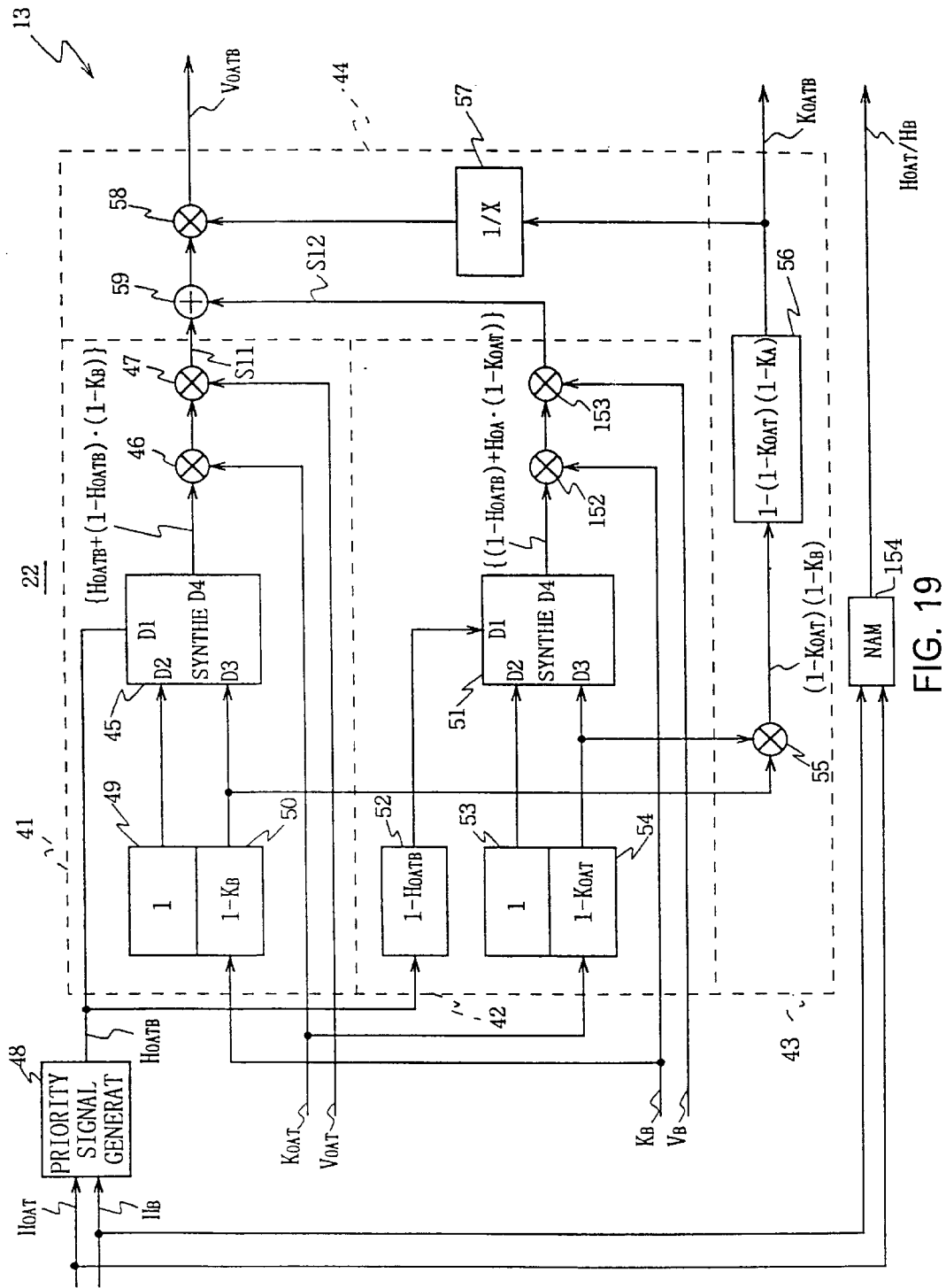
FIG. 19 is block diagram showing a detailed structure of a combiner of the second channel special effect processing part.
Figure 20:
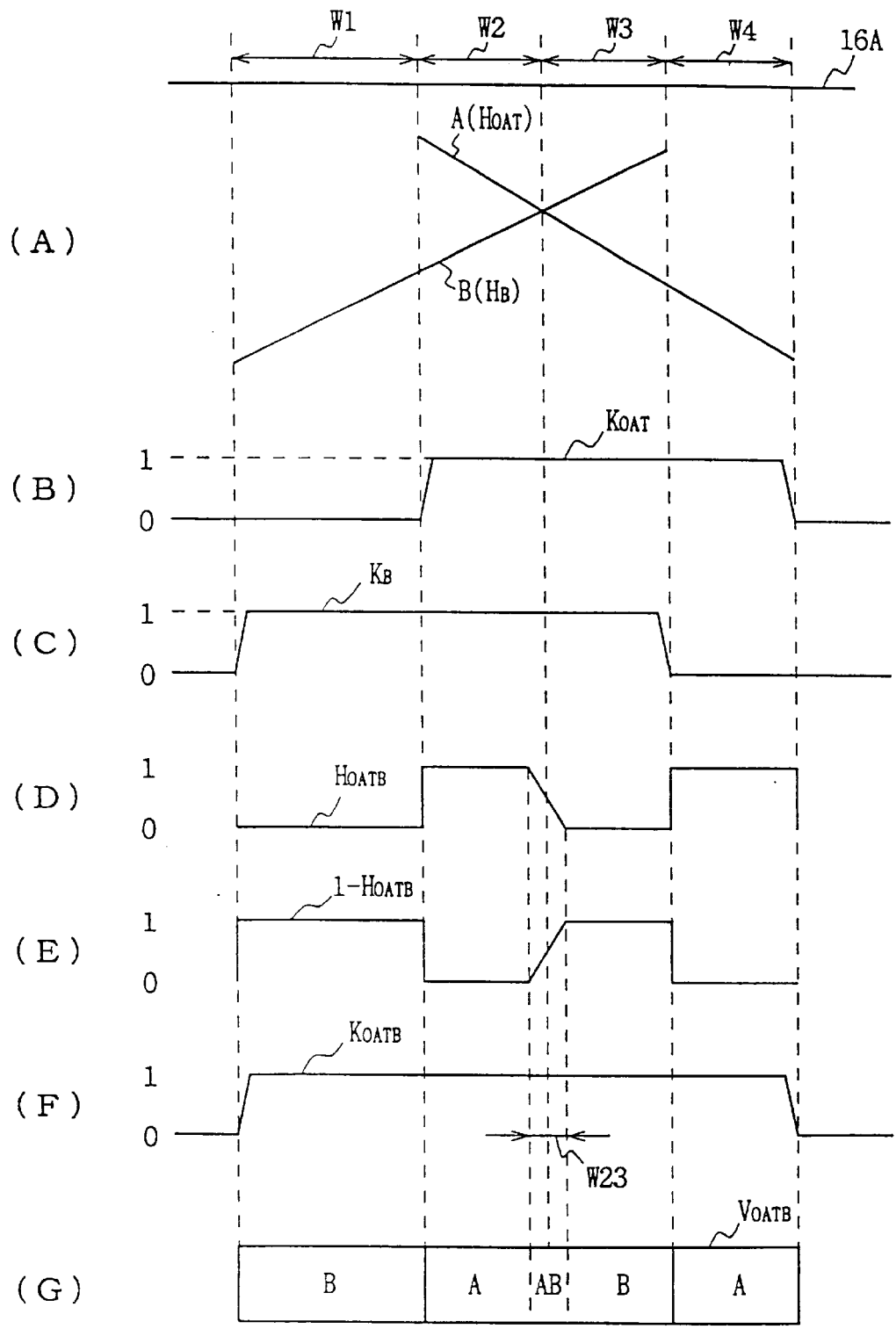
FIGS. 20(A) to (G) are signal waveform views explaining a synthesis processing operation of FIG. 19.

Thus, the combiner 22 of the second channel special effect processing part 13 adds the same code to the corresponding part of FIG. 13 to calculate the synthesis video signal $V_{OATB}$, the synthesis key signal $K_{OATB}$ and the synthesis depth signal $H_{OATB}$ related to image A and B (FIG. 20(A)) on the basis of the video signal, the key signal and the depth information of each image as shown in FIG. 19.

In other words, the combiner of the second special effect processing part 13 obtains the synthesis output data S11 of the following equation in the first image signal structure part 41 on the basis of the aforementioned theoretical equations (4) through (25) of the combiner, on the basis of the synthesis depth signal $H_{OATB}$ obtained in the depth information generating circuit 48 (FIG. 21), the key signal $K_B$ of the image B and the key signal $K_{OAT}$ and the video signal $V_{OAT}$ obtained from the first channel special effect processing part 12 with respect to the image A.

$$S11=\{H_{OATB} \cdot 1+(1-H_{OATB})(1-K_B)\}K_{OAT} \cdot V_{OAT} \quad (41)$$

Furthermore, in the second image signal processing part 42, on the basis of the synthesis depth signal $H_{OATB}$, on the basis of the output key signal $K_{OAT}$ obtained from the first channel special effect processing part 12, the key signal $K_B$, and the video signal $V_B$ of the image B, the following equation is calculated so that the synthesis output data 12 is obtained:

$$S12=\{(1-H_{OATB}) \cdot 1+H_{OATB}(1-K_{OAT})\}K_B \cdot V_B \quad (42)$$

Furthermore, in the key signal processing part 43, the synthesis key KOATB is obtained using the following equation:

$$K_{OATB}=1-(1-K_B)(1-K_{OAT}) \quad (43)$$

As a consequence, the synthesis video signal VOATB is obtained by calculating the following equation:

$$V_{OATB} = (\{H_{OATB}K_{OAT} + (1 - H_{OATB})(1 - K_B)K_{OAT}\}V_{OAT} + \quad (44)$$
$$\{(1 - H_{OATB})K_B + H_{OATB}(1 - K_{OAT})K_B\}V_B) \times$$
$$\frac{1}{1 - (1 - K_B)(1 - K_{OAT})}$$

Thus, with the combiner 22 of the second special effect processing part 13, in correspondence to FIGS. 12(A)

through (G), a transparent image of two images A and D which have intersected each other can be formed in a priority order on the basis of the depth information possessed by the images A and B on the screen surface 16A, as shown in FIGS. 20(A) to (C).

Figure 21:
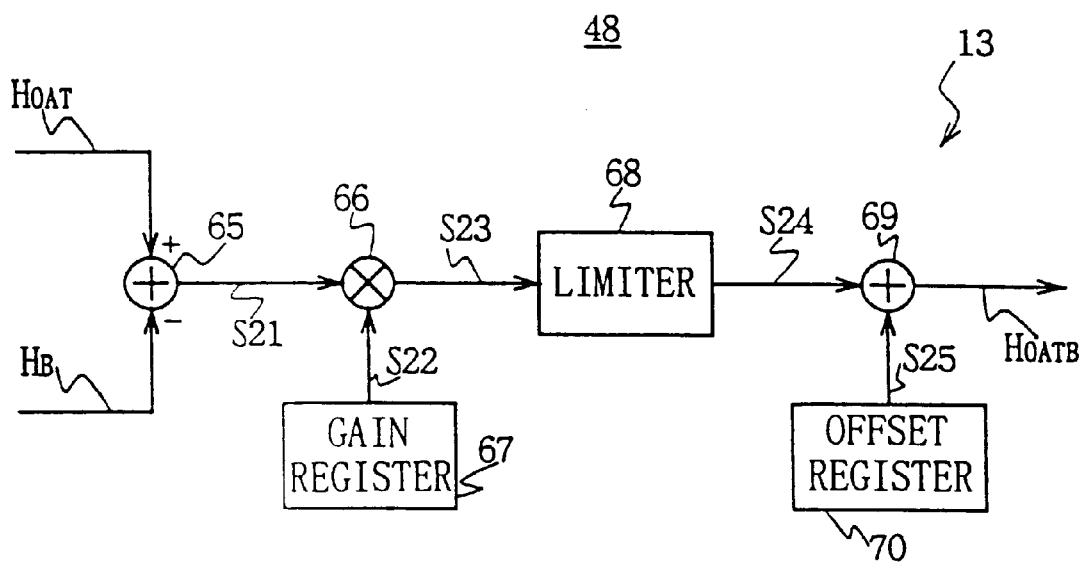
FIG. 21 is a block diagram showing a detailed structure if a priority signal generating circuit of FIG. 19.
Figure 22:
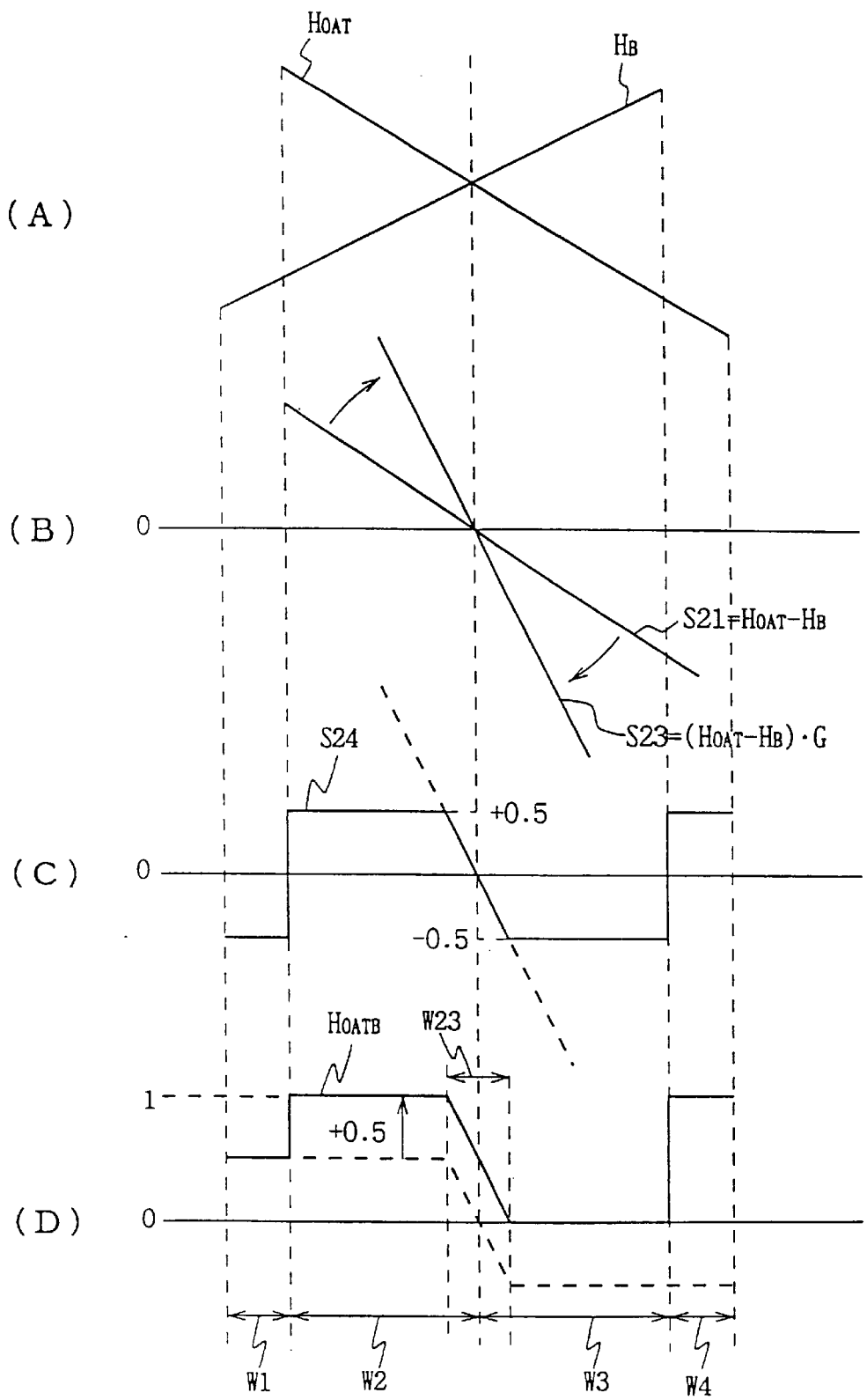
FIGS. 22(A) to (D) are signal waveform views explaining the operation of FIG. 21.

The depth information generating circuit 48 of the combiner 22 of the second channel special effect generating circuit 13 forms a synthesis depth signal $H_{OATB}$ which provides a special effect which looks soft in the neighboring range of the intersecting point on the basis of the output depth signal $H_{OAT}$ and the depth information $H_B$ of the image B obtained as residual image information P4 from the residual image generating circuit 23 of the first channel special effect processing part 12, as shown in FIGS. 22(A) through (D), corresponding to FIGS. 15(A) through (D), as shown in FIG. 21 by adding like symbols to the corresponding part of FIG. 14.

In this manner, the synthesis video signal $V_{OATB}$, the synthesis key signal $K_{OATB}$, and the synthesis depth signal $H_{OATB}$ obtained in the combiner 22 of the second special effect processing part 13 are provided to the residual image generating circuit 23.

Figure 16:
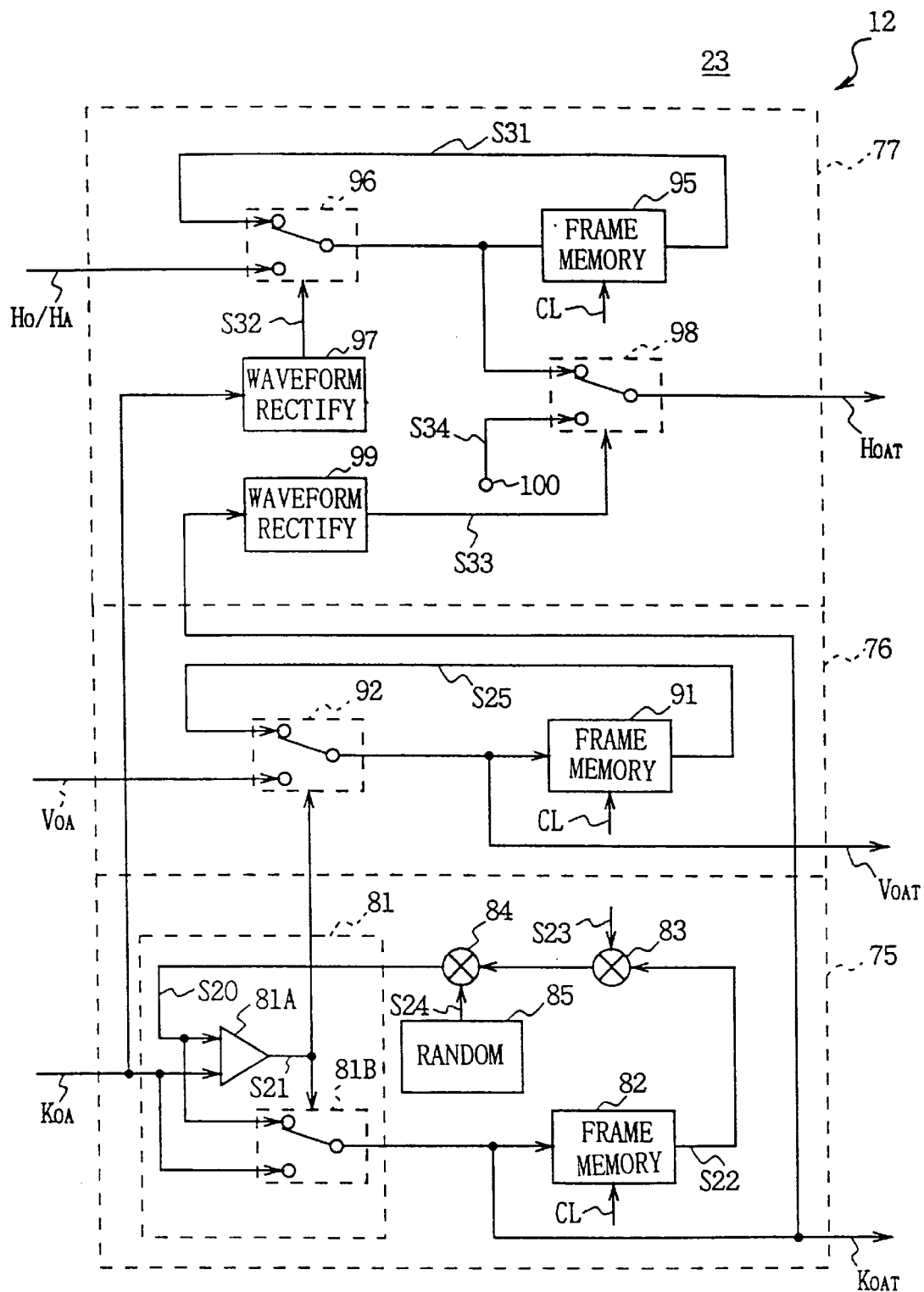
FIG. 16 is a block diagram showing a detailed structure of a residual image generating circuit in the first channel special effect processing part.
Figure 24:
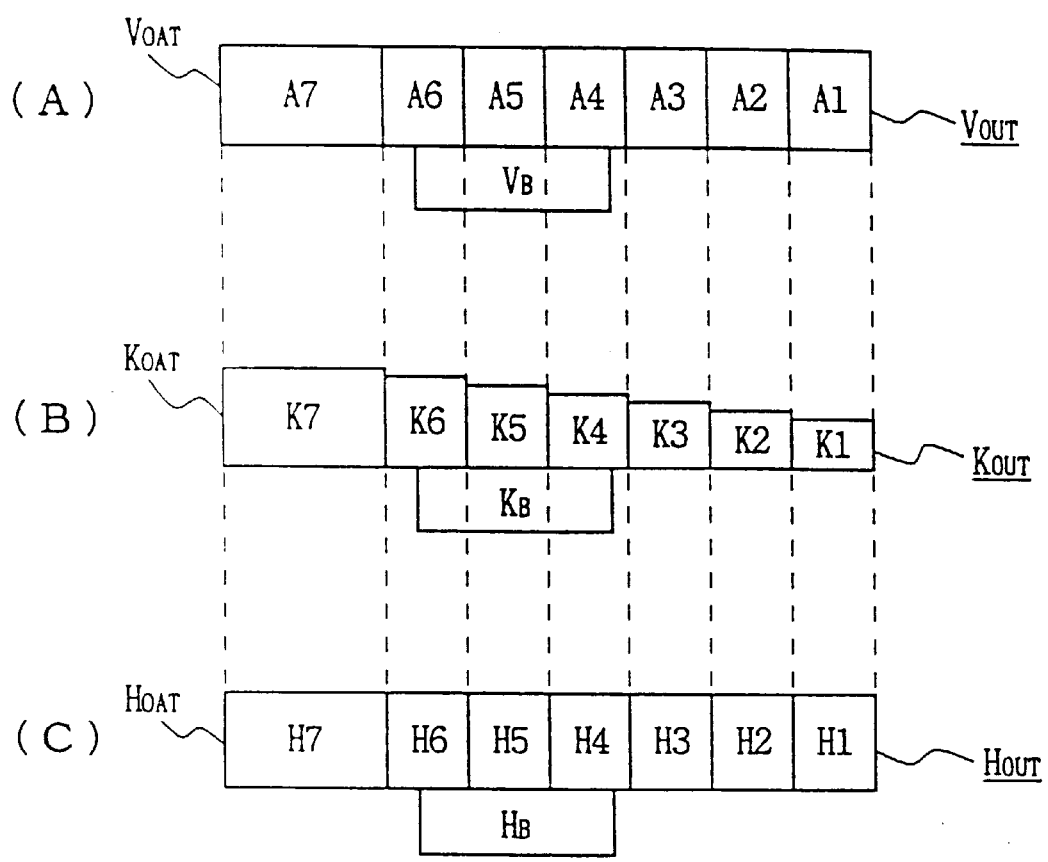
FIGS. 24(A) to (C) are schematic diagrams explaining a signal processing operation of the combiner of FIG. 19 and a signal processing operation of the residual image generating circuit of FIG. 23.
Figure 25:
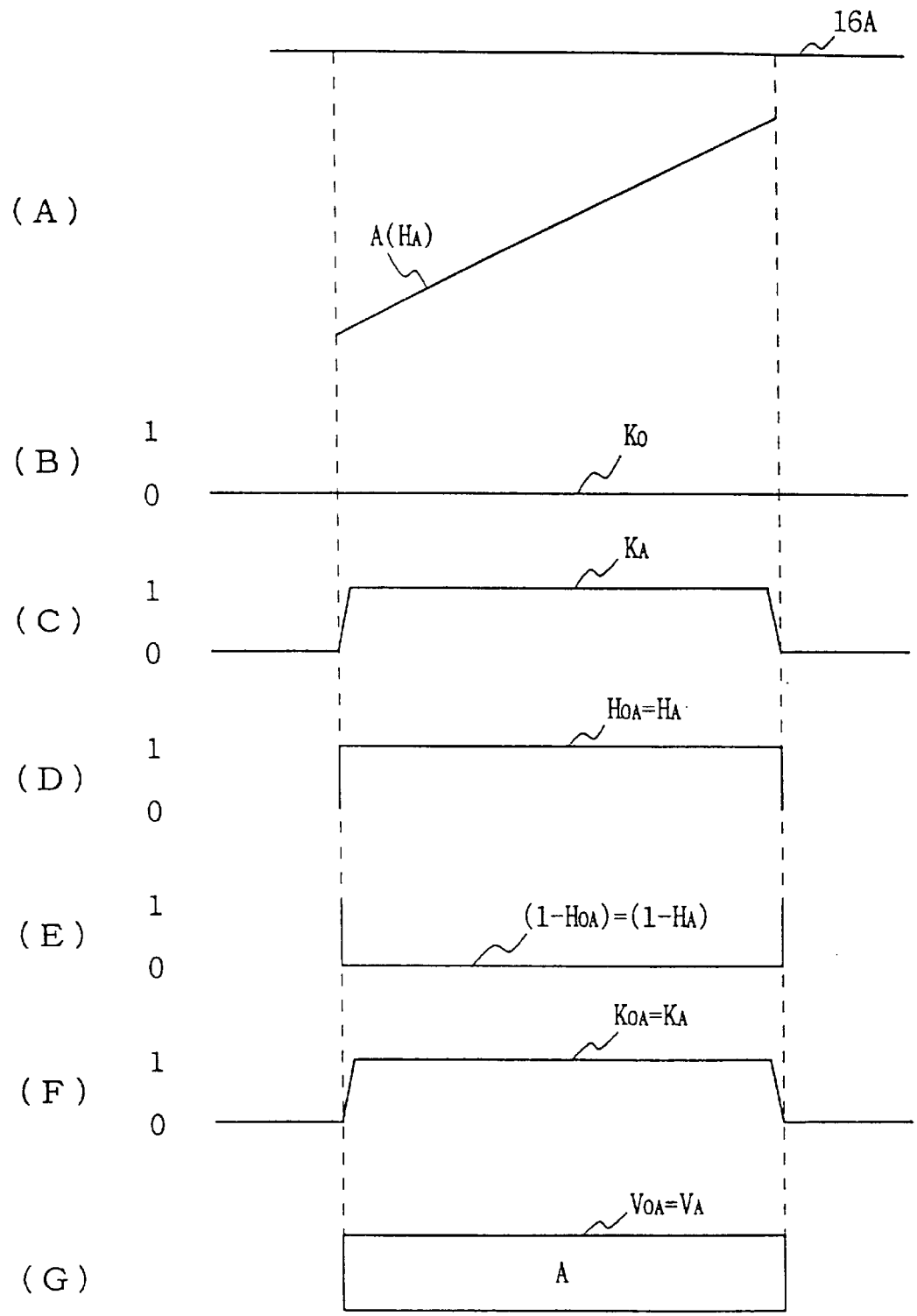
FIGS. 25(A) to (G) are signal waveform views explaining image information input to the first channel special effect processing part of FIG. 8.

The residual image generating circuit 23 of the second channel special effect processing part 13 has the same structure as the residual image generating circuit 23 of the first channel special effect 12 as shown in FIG. 24(B) by adding like symbols to the corresponding parts of FIG. 16. At the same time, on the basis of the synthesis key signal $K_{OATB}$, in the key signal circuit 75, as shown in FIG. 24(B), a key signal part with an attached residual images having key signals K1 through K6 corresponding to residual image parts formed so as to correspond to the movement of the moving body A and an output key signal $K_B$ corresponding to the image of the fixed plate B are formed in the first channel special effect processing part 12.

In addition, the residual image generating circuit 23 of the second special effect processing part 13 forms an output video signal $V_{OuT}$ (FIG. 24(A)) formed by combining the image $V_B$ of the fixed plate B in the image part of the output video signal HOAT of the image information P4 with the attached residual image information P4 which is generated in the residual image generating circuit 23 of the first channel special effect processing part 12 on the basis of the synthesis video signal $K_{OATB}$ supplied from the combiner 22 in the front column in the video signal circuit 76.

Furthermore, the depth signal circuit 77 of the residual image generating circuit 23 of the first channel special effect processing part 13 forms an output depth signal $H_{OUT}$ formed by combining the depth information of the output depth signal $V_{OUT}$ of the image information P4 with the attached residual image which is generated in the residual image generating circuit 23 of the first channel special effect processing part 12 and the depth information $H_B$ corresponding to the image of the fixed plate B.

In the aforementioned structure, out of the first and the second image information P1 and P2 input to the first channel special effect processing part 12, the video signal $V_O$, the key signal $K_O$ and the depth information $H_O$ that comprise the first image information are selected to be image information having no stereoscopic information like the image of the moving body A and of the fixed plate B in FIGS. 6(A) and (B) by actually providing information of $V_O=0$, $K_O=0$ and $H_O=0$ (i.e. infinity).

This is done for the purpose of making it possible to realize multi-functional processing by connecting in cascade a device having the same structure except when the signals which are processed by the first channel special effect processing part 12 and the second channel special effect processing part 13 are different. As a consequence, the key processing function of the combiner 22 (FIG. 13) of the first channel special effect processing part 12 is the same as described above with respect to FIGS. 12 and 13. The synthesis video signal $V_{OA}$, the synthesis key signal $K_{OA}$, and the synthesis depth signal $H_{OA}$ obtained by such processing operations are virtually $V_{OA}=V_A$ (FIG. 25(G)), $K_{OA}=K_A$ (FIG. 25(F) and $H_{OA}=H_A$, as shown in FIGS. 25(A) through (G) corresponding to FIGS. 12(A) through (G) respectively.

In this manner, the combiner 12 (FIGS. 8 and 13) of the first channel special effect processing part 12 performs a function of inputting the video signal $V_A$, the key signal $K_A$ and the depth information $H_A$ constituting the second image information P2 with respect to the moving body A (FIGS. 6 and 7) into the first channel special effect processing part 12.

In this manner, the residual image generating circuit 23 (FIG. 16) of the first channel special effect processing part 12 assumes a state in which the output key signal $K_{OAT}$, the output video signal $V_{OAT}$ as the residual image information shown in FIGS. 17(B), (A) and (C) are held in 91 to 95 accordingly as respective images of the moving body A moving diagonally forward from the back of the XYZ space at the rear side of the screen surface 16A (FIG. 6(A)).

The output key signal $K_{OAT}$, the output video signal $V_{OAT}$ and the output depth signal $H_{OAT}$ obtained at the residual image generating circuit 23 of the first channel special effect processing part 12 are input to the combiner 22 (FIG. 18 and FIG. 19) of the second channel special effect processing part 13 so that the image information on the moving body A is taken in substantially as it is with respect to the combiner 22 of the second channel special effect processing part 13.

On the other hand, the video data $V_B$ and the key data $K_B$ with respect to the image of the fixed plate B of the fixed plate B is read with a conversion address signal (x, y) generated in the pixel information generating circuit 35 in a state in which the data is input to the frame memory 33 and the key information memory 34 (FIG. 18), so that as shown in FIG. 7 the image of the fixed plate B is converted into a video signal $V_B$ in which the perspective method is adopted. At the same time, the data is converted into a key signal $K_B$ suitable to this.

In addition, in each pixel of the fixed plate B, the depth information $H_B$ generated by the application of the perspective method is calculated in the pixel information generating circuit 35 to be input into the combiner 22 (FIG. 19) of the second channel special effect processing part 13.

Thus, the combiner 22 of the second channel special effect processing part 13 is subjected to the keying processing, using the video signal $V_B$ representing the image of the fixed plate B which is subjected to processing on the basis of the perspective method, the video signal $V_{OAT}$ to which a residual image is added as the image of the moving body A, the key signal $k_B$ which is subjected to the processing based on the perspective method, and the key signal $K_{OAT}$ which is subjected to processing in which the residual images are added.

In addition, the depth information corresponding to each pixel representing the image of the fixed plate B which is subjected to the processing on the basis of the perspective method, the current image A7 of the moving body A, and the depth information $H_{OAT}$ corresponding to each pixel representing the current image A6 through A1 are supplied to the depth information generating circuit 18 from the residual image circuit 23 of the first channel special effect processing part 12 so that a synthesis depth signal $H_{OATB}$ having the depth information corresponding to the pixels having a high priority on the basis of the depth information $H_{OAT}$ is formed, so that the image which should be projected on the screen surface 16A from among the video signals $V_B$ and $V_{OAT}$ is judged in the pixel unit according to said depth information signal $H_{OATB}$ to be synthesized as a synthesis video signal $V_{OATB}$ and the synthesis key signal $K_{OATB}$.

Figure 23:
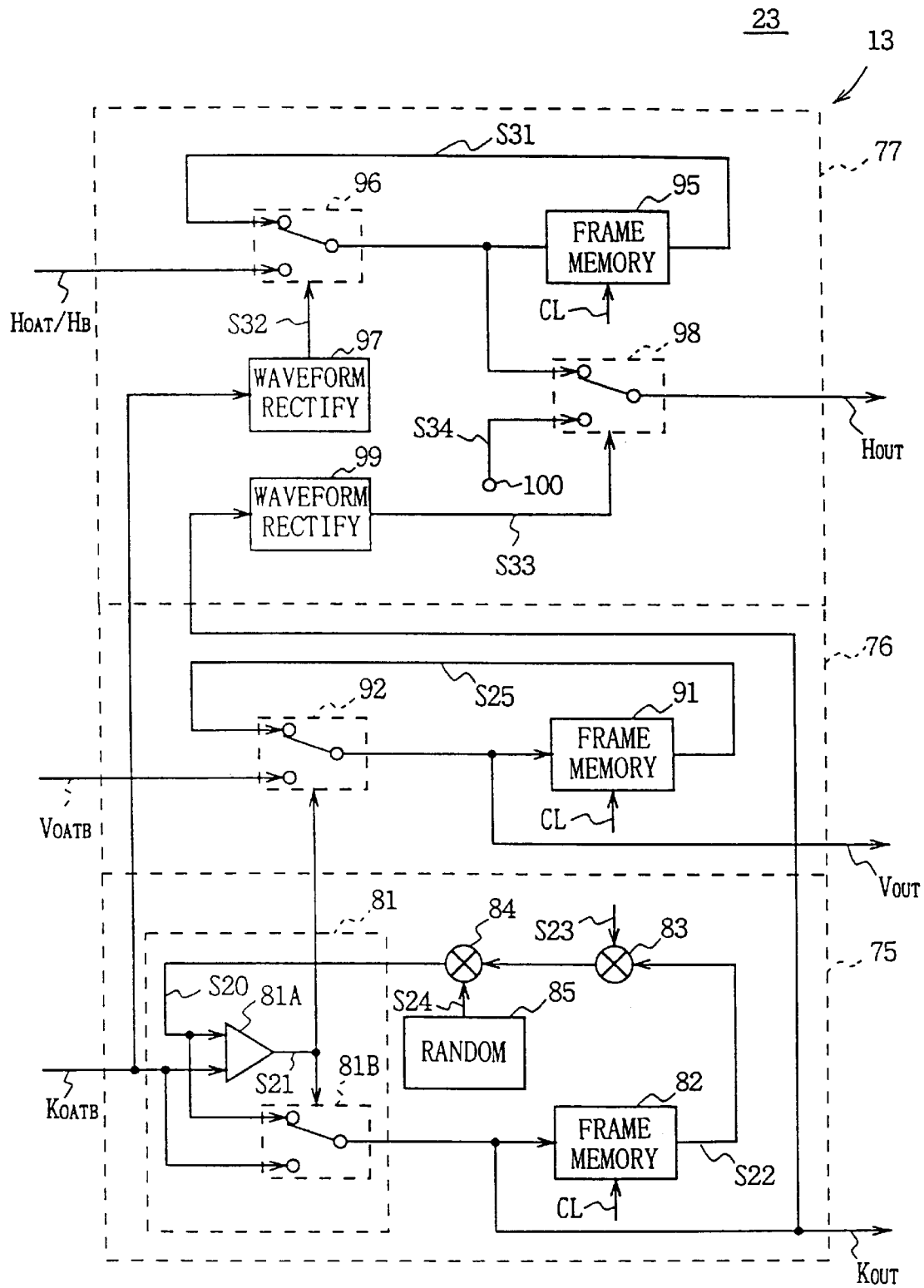
FIG. 23 is block diagram showing a detailed structure of a residual image generating circuit of the second channel special effect processing circuit.

Thus, the synthesis video signal $V_{OATB}$, the synthesis key signal $K_{OATB}$ and the synthesis depth signal $H_{OAT}/H_A$ synthesized in the combiner 22 of the second channel special effect processing part 13 are sent out to the switcher 15 (FIG. 5) as output video signal $V_{OUT}$, output key signal $K_{OUT}$ and output depth signal $H_{OUT}$ via the video signal circuit 76, the key signal circuit 75 and the depth signal circuit 77 of the residual generation circuit 23 (FIG. 23) of the second channel special effect processing part 13.

As a consequence, referring to output image information S7 (FIG. 5) provided from the switcher 15 to the monitor screen 16, as shown in FIG. 7, only pixels that should be produced on the screen surface are synthesized with the depth information in which the priority order can be judged not only with respect to the priority of the image of the fixed plate B and the current image A7 of the moving body A but also with respect to the image of the fixed plate B, and the residual images A6 through A1 of the moving body A. As a result, when the moving body A passes through the fixed plate B, the intersection of the current images A6 through A1 and residual images A6 through A1 can be clearly produced so that an image free from an sense of awkwardness can be realized as a display on the screen surface 16A.

In accordance with the aforementioned structure, when a plurality of images which intersect each other are displayed, depth information is provided with respect to each image and residual image so that a special effect image can be generated with respect to an image in the cross section.

Industrial Applicability

The present invention provides a special effect apparatus for broadcasting, an apparatus which can be applied to cases in which special effect images are generated.

TABLE OF REFERENCE NUMERALS

| | |
|---|---|
| 1 | SCREEN SURFACE |
| A | MOVING BODY |
| B | FIXED PLATE |
| A6 | CURRENT IMAGE |
| A5 TO A1 | RESIDUAL IMAGES |
| 11 | SPECIAL EFFECT SYSTEM |
| 12 | FIRST CHANNEL SPECIAL EFFECT PROCESSING PART |
| 13 | SECOND CHANNEL SPECIAL EFFECT PROCESSING PART |
| 14 | CONTROL PANEL |
| 15 | SWITCHER |
| 16 | MONITOR SCREEN |
| 16A | SCREEN SURFACE |
| 21 | COMBINED IMAGE FORMING PART |
| 22 | COMBINER |
| 23 | RESIDUAL IMAGE GENERATING CIRCUIT |
| 25 | INTERFACE |
| 26 | BUS |
| 27 | CPU |
| 33 | FRAME MEMORY |
| 34 | KEY INFORMATION MEMORY |
| 35 | PIXEL INFORMATION GENERATING CIRCUIT |
| 36 | REFERENCE CLOCK GENERATING CIRCUIT |
| 37 | SCREEN ADDRESS GENERATING CIRCUIT |

-continued

TABLE OF REFERENCE NUMERALS

| | |
|---|---|
| 41 | FIRST IMAGE SIGNAL SYNTHESIZING PART |
| 42 | SECOND IMAGE SIGNAL SYNTHESIZING PART |
| 43 | KEY SIGNAL SYNTHESIZING PART |
| 44 | SYNTHESIS OUTPUT PART |
| 48 | DEPTH INFORMATION GENERATING CIRCUIT |
| 75 | KEY SIGNAL CIRCUIT |
| 76 | VIDEO SIGNAL CIRCUIT |
| 77 | DEPTH SIGNAL CIRCUIT |

We claim:

1. A special effect apparatus comprising:

input means for receiving a first video data, a first key signal for keying said first video data, a first depth information designating the depth position of said first video data, second video data and a second key signal for keying said second video data;

image conversion control means being connected to receive said second video data and said second key signal for generating converted second video data and a converted second key signal by subjecting said second video data and said second key signal to spatial image conversion, and for generating second depth information representing the depth position of said converted second video data;

combining means for generating third video data and a third key signal for keying said third video data, said third video data comprising video data in which said first video data and said converted second video data are combined on the basis of said first key signal, said first depth information, said converted second key signal, and said second depth information; and residual image generating means for generating delayed video data delayed with respect to said third video data, delayed key signal delayed with respect to said third key signal, and delayed depth information delayed with respect to third depth information of said third video data which corresponds to one of said first depth information and said second depth information to control an output of said delayed video data, said delayed key signal and said delayed depth information so as to generate said third video data, said third key signal and the residual image of said third depth information.

2. The special effect apparatus according to claim 1 wherein said residual image generating means comprises a first memory for temporarily memorizing said third video data, a second memory for temporarily memorizing said third key signal and a third memory for temporarily memorizing said third depth information.

3. The special effect apparatus according to claim 1 wherein said residual image generating means further comprises a first output means for selectively controlling an output of said third video data, and an output of said delayed video data, and a second output means for selectively controlling the output of said third key signal and the output of said delayed key signal.

4. The special effect apparatus according to claim 1 wherein said residual image generating means further comprises a third output means for selectively controlling the output of said third depth information and the output of said delayed depth information on the basis of said third key signal.

5. The special effect apparatus according to claim 1 wherein said residual image generating means further comprises a first output means for selectively controlling an output of said third video data and an output of said delayed video data in accordance with the comparison result between said third key signal and said delayed key signal, a second output means for selectively controlling an output of said third key signal and an output of said delayed key signal, and a third output means for selectively controlling an output of said third depth information and an output of said delayed depth information.

6. The special effect apparatus according to claim 5 wherein said residual image generating means is such that when the key signal output from said second output means is "0" the depth information output from said third output means is "0".

7. The special effect apparatus according to claim 1 wherein said residual image generating means comprises a first memory for temporarily memorizing said third video data, a second memory for temporarily memorizing said third key signal, and a third memory for temporarily memorizing said third depth information, and a residual image data of said third video data is rendered variable by controlling the reading timing from said first memory, said second memory and said third memory.

8. The special effect apparatus according to claim 1 wherein said combining means generates a priority signal $H_{AB}$ for representing a relation between the depth position of said first video data and the depth position of said converted second video data on the basis of said first depth information and said second depth information.

9. The special effect apparatus according to claim 8 wherein said combining means generates third video data from said first video data and said converted second video data on the basis of said first key signal, said second key signal and said priority signal.

10. The special effect apparatus according to claim 8 wherein said priority signal $H_{AB}$ is defined in the equation:

$$H_{AB}=(H_A-H_B)\cdot G+O_{FF}$$

$$(0\leq H_{AB}\leq 1)$$

where $H_A$ represents the first depth information, $H_B$ represents the second depth information, G represents a gain value, and OFF represents an offset value.

11. The special effect apparatus according to claim 10 wherein said combining means controls a mixture ratio of said first video data and said converted second video data on the basis of said gain value in the vicinity of a place where said first video data and said converted second video data spatially intersect each other.

12. The special effect apparatus according to claim 1 wherein a mixture ratio of said first video data and said converted second video data is rendered linearly variable in the vicinity of a place where said first video data and said converted second video data spatially intersect each other.

13. The special effect apparatus according to claim 1 wherein a vector of two dimensional pixel data is represented as (x y H) in the homogeneous coordinate system and a vector of two dimensional pixel data of said converted second video data is represented as (xs ys 1) in the homogeneous coordinate system, where said second depth information is a pseudo-depth information obtained on the basis of H.

14. The special effect apparatus according to claim 1 wherein said second depth information is pseudo-depth information obtained on the basis of the expansion/reduction ratio of said converted second video data with respect to the video data memorized in a memory means.

15. A special effect apparatus comprising:

an input means for receiving video data, a key signal for keying said video data, and depth information representing the depth position for each pixel of said video data;

a delayed data generating means for generating a delayed key signal delayed in time with respect to said key signal supplied from said input means, generating a delayed video signal delayed in time with respect to said video data supplied from said input means, generating delayed depth information delayed in time with respect to said depth information supplied from said input means; and a residual image generating means for generating residual images of said video data, said key signal and said depth information by selectively controlling an output of said video data and said delayed video signal on the basis of said key signal supplied from said input means, by selectively controlling an output of said key signal and said delayed key signal and by controlling an output of said depth information and said delayed depth information.

16. The special effect apparatus according to claim 15 wherein said delayed data generating means comprises a first memory for temporarily memorizing said video data, a second memory for temporarily memorizing said key signal, and a third memory for temporarily memorizing said depth information.

17. The special effect apparatus according to claim 15 wherein said residual image generating means further comprises a first output means for selectively controlling an output of said video data supplied from said input means and an output of said delayed video signal supplied from said delayed data generating means in accordance with the comparison result of said key signal and said delayed key signal, a second output means for selectively controlling an output of said key signal supplied from said input means and an output of said delayed key signal supplied from said delayed data generating means.

18. The special effect apparatus according to claim 15 wherein said residual image generating means further comprises a third output means for selectively controlling an output of said depth information supplied from said input means and an output of said delayed depth information supplied from said delayed data generating means.

19. The special effect apparatus according to claim 15 wherein
said residual image generating means further comprises a first output means for selectively controlling an output of said video data supplied from said input means and an output of said delayed video signal supplied from said delayed data generating means,
a second output means for selectively controlling an output of said key signal supplied from said input means and an output of said delayed key signal supplied from said delayed data generating means, and
a third delayed data generating means for selectively controlling an output of said depth information supplied from said input means and an output of said delayed depth information supplied from said delayed data generating means.

20. The special effect apparatus according to claim 19 wherein
said residual image generating means is such that when the key signal output from said second output means is "0" the depth information output from said third output means is "0".

21. The special effect apparatus according to claim 15 wherein
said residual image generating means comprises a first memory for temporarily memorizing said video data, a second memory for temporarily memorizing said key signal, and a third memory for temporarily memorizing said depth information, and wherein a residual image of said video data is rendered variable by controlling the reading timing from said first memory, said second memory and said third memory.

22. A special effect apparatus comprising:
input means for receiving first video data, a first key signal for keying said first video data, first depth information representing the depth position of said first video data, second video data and a second key signal for keying said second video data;
memory means being connected to receive said second video data and said second key signal for temporarily memorizing said second video data and said second key signal;
image conversion control means for supplying a two dimensional address with respect to said memory means so that said second video data and said second key signal are subjected to spatial image conversion on the basis of a plurality of conversion parameters representing said spatial image conversion designated by an operator and for generating second depth information representing the depth position of the converted second video data; and
combining means for combining said first video and said converted second video on the basis of said first key signal, said first depth information, said converted second key signal and said second depth information.

23. The special effect apparatus according to claim 22 wherein
said combining means generates a priority signal $H_{AB}$ representing a relation between the depth position of said first video data and the depth position of said converted second video data on the basis of said first depth information and said second depth information.

24. The special effect apparatus according to claim 23 wherein
said combining means combines said first video data and said converted second video data on the basis of said first key signal, said second key signal and said priority signal.

25. The special effect apparatus according to claim 23 wherein said priority signal $H_{AB}$ is defined in the equation:

$$H_{AB}=(H_A-H_B) \cdot G+O_{FF}$$

$$(0 \leq H_{AB} \leq 1)$$

where $H_A$ represents the first depth information, $H_B$ represents the second depth information, G represents a gain value, and $O_{FF}$ represents an offset value.

26. The special effect apparatus according to claim 25 wherein
said combining means controls a mixture ratio of said first video data and said converted second video data on the basis of said gain value G in the vicinity of a place where said first video data and said converted second video data spatially intersect each other.

27. The special effect apparatus according to claim 22 wherein
the mixture ratio of said first video data and said converted second video data is linearly variable in the vicinity of a place where said first video data and said converted second video data spatially intersect each other.

28. The special effect apparatus according to claim 22 wherein
when a vector of two dimensional pixel data of second video data memorized in said memory means is represented as (x y H) in the homogeneous coordinate system and a vector of two dimensional pixel data of said converted second video data is represented as (xs ys 1)
said second depth information is pseudo-depth information obtained on the basis of H.

29. The special effect apparatus according to claim 22 wherein
said second depth information is pseudo-depth information obtained on the basis of the expansion/reduction ratio of said converted second video data with respect to said second video data memorized in said memory means.

30. The special effect apparatus according to claim 29 wherein
said expansion/reduction ratio is obtained on the basis of a preset perspective value and said plurality of conversion parameters.

31. The special effect apparatus according to claim 22 wherein
the said second depth information H is defined in the following equation:

$$H=b_{31}xs+b_{32}ys+b_{33}$$

however, $$b_{11} = \frac{-l_y P_y + r_{22} S}{-r_{22} \cdot l_x P_x + r_{21} l_y P_x + r_{21} l_x P_y - r_{11} l_y P_y - r_{12} r_{21} S + r_{11} r_{22} S}$$

$$b_{12} = \frac{-l_y P_x + r_{12} S}{-r_{22} \cdot l_x P_x + r_{21} l_y P_x + r_{12} l_x P_y - r_{11} l_y P_y - r_{12} r_{21} S + r_{11} r_{22} S}$$

-continued $$b_{13} = \frac{-r_{22}P_x + r_{12}P_y}{-r_{22} \cdot l_x P_x + r_{21} l_y P_x + r_{12} l_x P_y - r_{11} l_y P_y - r_{12} r_{21} S + r_{11} r_{22} S}$$

$$b_{31} = \frac{-r_{22} l_x + r_{21} l_y}{-r_{22} \cdot l_x P_x + r_{21} l_y P_x + r_{12} l_x P_y - r_{11} l_y P_y - r_{12} r_{21} S + r_{11} r_{22} S}$$

$$b_{32} = \frac{-r_{12} l_x + r_{11} l_y}{-r_{22} \cdot l_x P_x + r_{21} l_y P_x + r_{12} l_x P_y - r_{11} l_y P_y - r_{12} r_{21} S + r_{11} r_{22} S}$$

$$b_{33} = \frac{-r_{12} r_{21} + r_{11} r_{22}}{-r_{22} \cdot l_x P_x + r_{21} l_y P_x + r_{12} l_x P_y - r_{11} l_y P_y - r_{12} r_{21} S + r_{11} r_{22} S}$$

$$P_x = r_{11} P_{ox} + r_{12} P_{oy} + r_{13} P_{oz}$$

$$P_y = r_{12} P_{ox} + r_{22} P_{oy} + r_{23} P_{oz}$$

$$S = l_x P_{ox} + l_y P_{oy} + l_z P_{oz} + S_o$$

$$P_x = r_{11} P_{ox} + r_{12} P_{oy} + r_{13} P_{oz}$$

$$P_y = r_{12} P_{ox} + r_{22} P_{oy} + r_{23} P_{oz}$$

$$S = l_x P_{ox} + l_y P_{oy} + l_z P_{oz} + S_o$$

where, $r_{11}$ through $r_{33}$ represent parameters for rotation conversion, $P_{ox}$, $P_{oy}$ and $P_{oz}$ represent parameters for representing perspective values in each axis, $S_o$ represents a parameter for representing an expansion/reduction ratio of video data, $l_x$, $l_y$ and $l_z$ represent parameters for parallel movement, and xs and ys represent screen addresses.

32. A special effect system comprising a first special effect apparatus and a second special effect apparatus:

said first special effect apparatus comprising:

a first input means for receiving first video data and a first key signal for keying said first video data, a first memory means being connected to receive said first video data and said first key signal for temporarily memorizing said first video data and said first key signal, a first image conversion means for supplying a two dimensional reading address to said memory means so that said first video data and said first key signal are subjected to spatial image conversion respectively on the basis of a plurality of parameters representing a spatial image conversion designated by an operator, and for generating first depth information for representing the depth position of converted first video data, and a residual image generating means for generating delayed video data delayed with respect to said first video data, a delayed key signal delayed with respect to said first key signal, and delayed depth information delayed with respect to said first depth information, and for generating residual video data comprising said first video data and said delayed video data, a residual key signal comprising said first key signal and said delayed key signal, and residual depth information comprising said first depth information and said delayed depth information;

said second special effect apparatus comprising:

an input means for receiving said residual video data, said residual key signal, said residual depth information, a second video data, and a second key signal for keying a second video data, an image conversion control means being connected to said second video data and said second key signal for generating converted second video data and converted second key signal by subjecting said second video data and said second key signal to a spatial image conversion and for generating second depth information representing the depth position of said converted second video data, and a combining means for generating third video data comprising video data combining said residual video data and said converted second video data and third key signal keying said third video data, on the basis of said residual key signal, said residual depth information, said converted second key signal, and said second depth information.

33. An image conversion method for performing a spatial image conversion on video data, said method comprising the steps of:

(a) receiving first video data, a first key signal for keying said first video data, first depth information for representing the depth position of said first video data, a second video data, and a second key signal for keying said second video data;

(b) temporarily memorizing said second video data and said second key signal;

(c) supplying a two dimensional reading address to a memory means so that said second video data and said second key signal are subjected to said spatial image conversion respectively on the basis of the plurality of conversion parameters representing spatial image conversion designated by an operator, and for generating a second depth information representing the depth information of a converted second video data for each pixel; and (d) combining said first video data and said converted second video data on the basis of said first key signal, said first depth information, said converted second key signal and said second depth information.

34. The image conversion method according to claim 33 wherein said step (d) further comprises a step for generating a priority signal $H_{AB}$ representing a relation between the depth position of said first video data and the depth position of said converted second video data on the basis of said first depth information and said second depth information.

35. The image conversion method according to claim 34 wherein said priority signal $H_{AB}$ is defined in an equation:

$$H_{AB} = (H_A - H_B) \cdot G + O_{FF}$$

$$(0 \leq H_{AB} \leq 1)$$

where $H_A$ represents the first depth information, $H_B$ represents the second depth information, G represents a gain value, and $O_{FF}$ represents an offset value.

36. The image conversion method according to claim 35 wherein at said step (d), the mixture ratio of said first video data and said converted second video data is controlled on the basis of said gain value G in the vicinity of a place where said first video data and said second video data spatially intersect each other.

37. The image conversion method according to claim 33 wherein when a vector of two dimensional pixel data of said second video data memorized in said memory means is represented as (x y H) in the homogeneous coordinate system, and a vector of two dimensional pixel data of said converted second video data is represented as (xs ys 1) in the homogeneous coordinate system, said second depth information is pseudo-depth information obtained on the basis of H.

38. The special effect apparatus according to claim 10 wherein said third video data is defined in the equation:

$$V_{OUT} = \frac{\{H_{AB}K_A + (1 - H_{AB})K_A(1 - K_B)\}V_A + \{(1 - H_{AB})K_B + H_{AB}K_B(1 - K_A)\}V_B}{\{1 - (1 - K_A)(1 - K_B)\}}$$

where $V_{OUT}$ represents said third video data, $V_A$ represents the first video data, $K_A$ represents the first key signal, $V_B$ represents the converted second video data, and $K_B$ represents the converted second key signal.

39. The special effect apparatus according to claim 25 wherein the video data output from said combining means is defined in an equation:

$$V_{OUT} = \frac{\{H_{AB}K_A + (1 - H_{AB})K_A(1 - K_B)\}V_A + \{(1 - H_{AB})K_B + H_{AB}K_B(1 - K_A)\}V_B}{\{1 - (1 - K_A)(1 - K_B)\}}$$

where $V_{OUT}$ represents the video data output from said combining means, $V_A$ represents the first video data, $K_A$ represents the first key signal, $V_B$ represents the converted second video data, and $K_B$ represents the converted second key signal.

40. The special effect apparatus according to claim 22 wherein said two dimensional address for $(X_R, Y_R)$ is defined in the following equations:

$$X_R = (b_{11}xs + b_{21}ys + b_{31})/(b_{13}xs + b_{23}ys + b_{33})$$

and $$Y_R = (b_{12}xs + b_{22}ys + b_{32})/(b_{13}xs + b_{23}ys + b_{33})$$

-continued however, $$b_{11} = \frac{-l_Y P_Y + r_{22}S}{-r_{22} \cdot l_X P_X + r_{21}l_Y P_X + r_{12}l_X P_Y - r_{11}l_Y P_Y - r_{12}r_{21}S + r_{11}r_{22}S}$$

$$b_{12} = \frac{l_Y P_X - r_{12}S}{-r_{22} \cdot l_X P_X + r_{21}l_Y P_X + r_{12}l_X P_Y - r_{11}l_Y P_Y - r_{12}r_{21}S + r_{11}r_{22}S}$$

$$b_{13} = \frac{-r_{22}P_X + r_{12}P_Y}{-r_{22} \cdot l_X P_X + r_{21}l_Y P_X + r_{12}l_X P_Y - r_{11}l_Y P_Y - r_{12}r_{21}S + r_{11}r_{22}S}$$

$$b_{31} = \frac{-r_{22}l_X + r_{21}l_Y}{-r_{22} \cdot l_X P_X + r_{21}l_Y P_X + r_{12}l_X P_Y - r_{11}l_Y P_Y - r_{12}r_{21}S + r_{11}r_{22}S}$$

$$b_{32} = \frac{r_{12}l_X - r_{11}l_Y}{-r_{22} \cdot l_X P_X + r_{21}l_Y P_X + r_{12}l_X P_Y - r_{11}l_Y P_Y - r_{12}r_{21}S + r_{11}r_{22}S}$$

$$b_{33} = \frac{-r_{12}r_{21} + r_{11}r_{22}}{-r_{22} \cdot l_X P_X + r_{21}l_Y P_X + r_{12}l_X P_Y - r_{11}l_Y P_Y - r_{12}r_{21}S + r_{11}r_{22}S}$$

$$P_X = r_{12}P_{0X} + r_{12}P_{0Y} + r_{13}P_{0Z}$$

-continued $$P_Y = r_{12}P_{0X} + r_{22}P_{0Y} + r_{23}P_{0Z}$$

$$S = l_X P_{0X} + l_Y P_{0Y} + l_Z P_{0Z} + S_0$$

where, $r_{11}$ through $r_{33}$ represent parameters for rotation conversion, $P_{ox}P_{oy}$ and $P_{oz}$ represent parameters for representing perspective values in each axis, $S_o$ represents a parameter for representing an expansion/reduction ratio of video data, $l_x$, $l_y$ and $l_z$ represent parameters for parallel movement, and xs and ys represent screen addresses.

41. The image conversion method according to claim 35 wherein video data output from said combining step is defined in the following equation:

$$V_{OUT} = \frac{\{H_{AB}K_A + (1 - H_{AB})K_A(1 - K_B)\}V_A + \{(1 - H_{AB})K_B + H_{AB}K_B(1 - K_A)\}V_B}{\{1 - (1 - K_A)(1 - K_B)\}}$$

where $V_A$ represents the first video data, $K_A$ represents the first key signal, $V_B$ represents the converted second video data, and $K_B$ represents the converted second key signal.

* * * * *